United States Patent
Millman

(10) Patent No.: US 10,654,585 B2
(45) Date of Patent: May 19, 2020

(54) VEHICLE GUIDANCE SYSTEM AND METHOD THAT USES AIR DATA FROM SURFACE-MOUNTED PRESSURE SENSORS FOR VEHICLE ORIENTATION CONTROL

(71) Applicant: Booz Allen Hamilton Inc., McLean, VA (US)

(72) Inventor: Daniel R. Millman, Houston, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 195 days.

(21) Appl. No.: 15/794,080

(22) Filed: Oct. 26, 2017

(65) Prior Publication Data
US 2018/0118370 A1    May 3, 2018

Related U.S. Application Data

(60) Provisional application No. 62/414,310, filed on Oct. 28, 2016, provisional application No. 62/449,285, (Continued)

(51) Int. Cl.
*B64D 43/02* (2006.01)
*G01P 13/02* (2006.01)
(Continued)

(52) U.S. Cl.
CPC .............. *B64D 43/02* (2013.01); *B64C 13/18* (2013.01); *G01L 19/0084* (2013.01); *G01P 5/14* (2013.01); *G01P 13/025* (2013.01); *G05D 1/0808* (2013.01)

(58) Field of Classification Search
CPC ..... B64C 13/18; B64D 43/02; G01L 19/0084; G01P 13/025; G01P 5/14; G05D 1/0808
See application file for complete search history.

(56) References Cited

U.S. PATENT DOCUMENTS

| 6,253,166 B1 * | 6/2001 | Whitmore ............. G01P 13/025 700/89 |
| 6,336,060 B1 * | 1/2002 | Shigemi .................. G01P 5/165 244/177 |

(Continued)

OTHER PUBLICATIONS

Christopher D. Karlgaard et al., "Mars Entry Atmospheric Data System Modeling and Algorithm Development", AIAA 2009-3916, San Antoino, TX, Jun. 2009, pp. 1-21.

(Continued)

*Primary Examiner* — Nicholas K Wiltey
*Assistant Examiner* — Tiffany K Luu
(74) *Attorney, Agent, or Firm* — Buchanan Ingersoll & Rooney PC

(57) ABSTRACT

A vehicle guidance system, including: sensors to detect a surface pressure distribution for a respective location of the corresponding sensor on a vehicle, respectively; and a controller to receive an initial value for a Mach number; and calculate a converged value for an angle of attack based on first surface pressure data from a first set of the sensors, and a converged sideslip angle value based on second surface pressure data from a second set of the sensors. The controller calculates a freestream dynamic pressure based on the initial Mach number, the converged angle of attack, and the converged sideslip angle value, and calculates a freestream pressure, and calculates a converged value for Mach number based on the freestream pressure and the freestream dynamic pressure. A flight control processor provides an output for adjusting an orientation of the vehicle based on the converged Mach number and the freestream pressure.

26 Claims, 13 Drawing Sheets

Related U.S. Application Data filed on Jan. 23, 2017, provisional application No. 62/468,596, filed on Mar. 8, 2017, provisional application No. 62/513,729, filed on Jun. 1, 2017.

(51) Int. Cl.
| | | |
|---|---|---|
| *G01P 5/14* | (2006.01) | |
| *B64C 13/18* | (2006.01) | |
| *G01L 19/00* | (2006.01) | |
| *G05D 1/08* | (2006.01) | |

(56) References Cited

U.S. PATENT DOCUMENTS

| | | | |
|---|---|---|---|
| 10,006,928 B1* | 6/2018 | Hagerott | G01P 13/025 |
| 2002/0169526 A1* | 11/2002 | Alwin | G05D 1/0204 |
| | | | 701/14 |
| 2008/0066540 A1 | 3/2008 | Childers et al. | |
| 2010/0274444 A1 | 10/2010 | Williamson et al. | |
| 2014/0067168 A1 | 3/2014 | Tran et al. | |
| 2015/0219512 A1* | 8/2015 | Bruti | G01P 13/025 |
| | | | 701/14 |
| 2016/0041196 A1 | 2/2016 | Frey, Jr. et al. | |

OTHER PUBLICATIONS

K.L. Bibb et al., Abstract for "Orion EFT-1 FADS-Based Trajectory Reconstruction", AIAA 2016-3254, Washington, DC, Jun. 2016, 1 page.

H. Wolf et al., "Shuttle Entry Air Data System (SEADS): Optimization of Preflight Algorithms based on Flight Results", AIAA 86-2053, May 1968, pp. 1-12.

Susanne Weiss, "Comparing Three Algorithms for Modeling Flush Air Data Systems", AIAA 2002-13830, Reno, NV, Jan. 2002, 11 pages.

Brent R. Cobleigh et al., "Flush Airdata Sensing (FADS) System Calibration Procedures and Results for Blunt Forebodies", NASA/TP 1999-209012, Nov. 1999, 32 pages.

Stephen A. Whitmore et al., "Preliminary Results From a Subsonic High Angle-of-Attack Flush Airdata Sensing (HI-FADS) System: Design, Calibration, and Flight Test Evaluation", NASA TM 101713, Jan. 1990, 14 pages.

Soumyo Dutta et al., "Cramér-Rao Lower-Bound Optimization of Flush Atmospheric Data System Sensor Placement", Journal of Spacecraft and Rockets, vol. 51, No. 6, Nov. 2014, pp. 1773-1788.

Peter H. Zipfel, "Modeling and Simulation of Aerospace Vehicle Dynamics", AIAA Education Series, American Institute of Aeronautics and Astronautics, Reston, VA, 2000, 3 pages.

Joel C. Ellsworth et al., "Simulation of a Flush Air-Data System for Transatmospheric Vehicles", Journal of Spacecraft and Rockets, vol. 45, No. 4, Jul. 2008, pp. 716-732.

Stephen A. Whitmore et al., "Failure Detection and Fault Management Techniques for a Pneumatic High-Angle-of-Attack Flush Airdata Sensing (HI-FADS) System", NASA TM 4335, Jan. 1992, 22 pages.

Christopher D. Karlgaard et al., "Mars Entry Atmospheric Data System Trajectory Reconstruction Algorithms and Flight Results", American Institute of Aeronautics and Astronautics, Jan. 2013, pp. 1-25.

International Search Report and Written Opinion of the International Searching Authority (Forms PCT/ISA/220, PCT/ISA/210 and PCT/ISA/237) dated Feb. 5, 2018, by the International Bureau of European Patent Office in corresponding International Application No. PCT/EP2017/058486. (9 pages).

Dutta et al., "Cramer-Rao Lower Bound Optimization of Flush Atmospheric Data Systems Sensor Placement," Journal of Spacecraft and Rockets, vol. 51, No. 6, pp. 1773-1788, Nov.-Dec. 2014.

\* cited by examiner

Table of the Coefficients of Pressure

| Mach | $\alpha$ | $\beta$ | $C_p$ |
|---|---|---|---|
| $M_1$ | $\alpha_1$ | $\beta_1$ | $C_p(M_1,\alpha_1,\beta_1)$ |
| $M_1$ | $\alpha_1$ | $\beta_2$ | $C_p(M_1,\alpha_1,\beta_2)$ |
| $M_1$ | $\alpha_1$ | $\beta_3$ | $C_p(M_1,\alpha_1,\beta_3)$ |
| $M_1$ | $\alpha_2$ | $\beta_1$ | $C_p(M_1,\alpha_2,\beta_1)$ |
| $M_1$ | $\alpha_2$ | $\beta_2$ | $C_p(M_1,\alpha_2,\beta_2)$ |
| $M_1$ | $\alpha_2$ | $\beta_3$ | $C_p(M_1,\alpha_2,\beta_3)$ |
| $M_1$ | $\alpha_3$ | $\beta_1$ | $C_p(M_1,\alpha_3,\beta_1)$ |
| $M_1$ | $\alpha_3$ | $\beta_2$ | $C_p(M_1,\alpha_3,\beta_2)$ |
| $M_1$ | $\alpha_3$ | $\beta_3$ | $C_p(M_1,\alpha_3,\beta_3)$ |
| $M_2$ | $\alpha_1$ | $\beta_1$ | $C_p(M_2,\alpha_1,\beta_1)$ |
| ... | ... | ... | ... |
| $M_i$ | $\alpha_j$ | $\beta_k$ | $C_p(M_i,\alpha_j,\beta_k)$ |

700

Obtain the coefficients of pressure ($C_{p_i}$) from the $M_\infty$-$\alpha$-$\beta$ table via trilinear interpolation or from a polynomial approximation.

Fig. 7

Typical behavior of the polynomial given in Eq. (22)

VEHICLE GUIDANCE SYSTEM AND METHOD THAT USES AIR DATA FROM SURFACE-MOUNTED PRESSURE SENSORS FOR VEHICLE ORIENTATION CONTROL

CROSS-REFERENCE TO RELATED APPLICATIONS

This application claims the benefit of Provisional Application Ser. No. 62/414,310 filed on Oct. 28, 2016, Provisional Application Ser. No. 62/449,285 filed on Jan. 23, 2017, Provisional Application Ser. No. 62/468,596 filed on Mar. 8, 2017, and Provisional Application Ser. No. 62/513,729 filed on Jun. 1, 2017, the entire contents of each of which are incorporated by reference herein.

FIELD

The present disclosure relates to a vehicle guidance system and method that uses air data from surface-mounted pressure sensors to provide an output for adjusting orientation of a vehicle.

BACKGROUND

U.S. Pat. No. 6,253,166 entitled "Stable Algorithm for Estimating Airdata from Flush Surface Pressure Measurements" by Stephen A. Whitmore et al. describes a flush air data sensing (FADS) system for estimating air data using nonintrusive surface pressure measurements from a vehicle surface. U.S. Pat. No. 6,253,166 describes transforming an air flow model by strategically taking differences from outputs of three surface pressure sensors, known as triples. This triples formulation is then used to estimate and compute air data for air surrounding a flight vehicle from the surface pressure measurements. Accurate air data (e.g., Mach number, dynamic pressure, angle of attack, angle of sideslip, surface winds, airspeed, altitude, etc.) can help ensure efficient and safe flight. U.S. Pat. No. 6,253,166 describes six sensors located on a nose of a flight vehicle. An angle of attack is decoupled from an angle of sideslip by using specific locations of pressure sensors aligned along the vertical meridian of the nose.

A paper entitled "Simulation of a Flush Air-Data System for Transatmospheric Vehicles" in the Journal of Spacecraft and Rockets, Vol. 45, No. 4, July-August 2008, by Joel C. Ellsworth et al. describes a FADS system based on the X-34 outer mold line.

A paper entitled "Mars Entry Atmospheric Data System Trajectory Reconstruction Algorithms and Flight Results" by Christopher D. Karlgaard et al. from the $51^{st}$ AIAA Aerospace Sciences Meeting including the New Horizons Forum and Aerospace Exposition on Jan. 7-10, 2013 describes a system of seven pressure transducers linked to ports on the entry vehicle forebody to record pressure distribution during atmospheric entry. The measured surface pressures are used to generate estimates of atmospheric quantities based on modeled surface pressure distributions.

A paper entitled "Flush Airdata Sensing (FADS) System Calibration Procedures and Results for Blunt Forebodies," by Brent R. Cobleigh et al., American Institute of Aeronautics and Astronautics, Inc., 1999, describes using blunt-forebody pressure data to study behavior of NASA Dryden Flight Research Center FADS pressure model and solution algorithm.

A paper entitled "Comparing Three Algorithms for Modeling Flush Air Data Systems" by Susanne Weiss from the $40^{th}$ AIAA Aerospace Sciences Meeting and Exhibit on Jan. 14-17, 2002 describes a FADS system mounted on a modified centerline tank of an F-4 Phantom. This document compares a weighted least squares solution to a triples-based solution and a five-hole probe method. The contents of the foregoing documents are hereby incorporated by reference herein in their entireties.

SUMMARY

An exemplary embodiment of the present disclosure provides a vehicle guidance system, including: a plurality of surface-mounted pressure sensors configured to be mounted on a vehicle, each sensor being configured to detect a surface pressure distribution for a respective location of the corresponding sensor on a vehicle, respectively. The vehicle guidance system includes an air data estimation controller configured to be connected to each of the plurality of surface-mounted pressure sensors. The air data estimation controller is configured to receive an initial value for a Mach number of the vehicle; and calculate a converged value for an angle of attack of the vehicle based on first surface pressure data from a first set of the surface-mounted pressure sensors, and a converged sideslip angle value of the vehicle based on second surface pressure data from a second set of the surface-mounted pressure sensors. The air data estimation controller is configured to calculate a freestream dynamic pressure based on the initial value for Mach number, the calculated converged value for angle of attack, and the calculated converged sideslip angle value, and configured to calculate a freestream pressure, and calculate a converged value for Mach number based on the calculated freestream pressure and the calculated freestream dynamic pressure. The vehicle guidance system includes a flight control processor configured to receive the calculated converged value for Mach number and the calculated freestream pressure from the air data estimation controller, and to provide an output command for adjusting an orientation of the vehicle based on the converged value for Mach number and the freestream pressure.

An exemplary embodiment of the present disclosure provides a method for guiding a vehicle that includes a plurality of surface-mounted pressure sensors mounted on the vehicle and an air data estimation controller connected to each of the plurality of surface-mounted pressure sensors. The method includes: detecting, by each surface-mounted pressure sensor, a surface pressure distribution for a respective location of the corresponding sensor on the vehicle, respectively; receiving, by the air data estimation controller, an initial value for Mach number of the vehicle; calculating, by the air data estimation controller, a freestream dynamic pressure based on the initial value for Mach number, a converged value for angle of attack of the vehicle, and a converged sideslip angle value of the vehicle; calculating a freestream pressure; calculating, by the air data estimation controller, a converged value for Mach number based on the freestream pressure and the freestream dynamic pressure; receiving, by a flight control processor, the converged value for Mach number and the freestream pressure from the air data estimation controller; and providing, by the flight control processor, an output command for adjusting an orientation of the vehicle based on the converged value for Mach number and the freestream pressure.

An exemplary embodiment of the present disclosure provides a non-transitory computer-readable storage medium having instructions stored thereon which, when executed by at least one processor of an air data estimation controller, perform a method for guiding a vehicle, wherein the vehicle includes a plurality of surface-mounted pressure sensors mounted on the vehicle and the air data estimation controller is connected to each of the plurality of surface-mounted pressure sensors. The method includes: receiving a detected surface pressure distribution for a respective location of the corresponding sensor on the vehicle, respectively; receiving an initial value for Mach number of the vehicle; calculating a freestream dynamic pressure based on the initial value for Mach number, a converged value for angle of attack of the vehicle, and a converged sideslip angle value of the vehicle; calculating a freestream pressure; calculating a converged value for Mach number based on the freestream pressure and the freestream dynamic pressure; and sending, to a flight control processor, the converged value for Mach number and the freestream pressure from the air data estimation controller, so that the flight control processor can provide an output command for adjusting an orientation of the vehicle based on the converged value for Mach number and the freestream pressure.

BRIEF DESCRIPTION OF THE DRAWINGS

The scope of the present disclosure is best understood from the following detailed description of exemplary embodiments when read in conjunction with the accompanying drawings, wherein:

FIG. 7 illustrates a table of the coefficients of pressure according to an exemplary embodiment;

DETAILED DESCRIPTION

The nomenclature below is used throughout the present disclosure.

| Nomenclature | |
| --- | --- |
| A, B, C, D, E | Coefficients for the angle of attack and sideslip angle computations |
| a, b, c | Coefficients for the angle of attack computations |
| $c_0, c_1, c_2, c_3, c_4$ | Coefficients for the angle of attack computations |
| $\hat{c}_0, \hat{c}_1, \hat{c}_2$ | Coefficients for sideslip angle computations |
| f | trigonometric polynomial in $\alpha$ |
| df/d$\alpha$ | derivative of the trigonometric polynomial in $\alpha$ |
| M | Mach number |
| p | pressure |
| P | pressure differences |
| $\bar{q}$ | dynamic pressure |
| $q_c$ | compressible dynamic pressure |
| r | position vector, normal to the body surface |
| V | velocity vector |
| $\alpha_1, \alpha_2$ | guess and new values of the angle of attack |
| $\varepsilon$ | tolerance value |

| Superscripts and Subscripts | |
| --- | --- |
| i, j, k | pressure sensor locations |
| ik, ji, kj | indicates which pressure sensors are differenced |
| n, n + 1 | iterates |
| $\infty$ | freestream conditions |

| Scalers | |
| --- | --- |
| $a_i, a_j, a_k$ | parameters from Eq. 3 |
| $b_i, b_j, b_k$ | parameters from Eq. 3 |
| $c_i, c_j, c_k$ | parameters from Eq. 3 |
| $\hat{c}_0, \hat{c}_1, \hat{c}_2$ | coefficients of Eq. 17 |
| $c_0, c_1, c_2, c_3, c_4$ | coefficients of Eq. 22 |
| $a_{n, m}$ | coefficients of Eq. 28 |
| $b_n$ | coefficients of Eq. 27 |
| $A_i, A_j, A_k$ | parameters defined in Eq. 24 |
| $B_i, B_j, B_k$ | parameters defined in Eq. 24 |
| $C_i, C_j, C_k$ | parameters defined in Eq. 24 |
| $D_i, D_j, D_k$ | parameters defined in Eq. 24 |
| $E_i, E_j, E_k$ | parameters defined in Eq. 24 |
| $C_p$ | coefficient of pressure |
| $M_\infty$ | freestream Mach number |
| $p_\infty$ | freestream pressure, psf |
| $q_c$ | compressible dynamic pressure, psf |
| $q_\infty$ | dynamic pressure, psf |
| u, v, w | velocity components, ft/sec |
| $V_\infty$ | freestream velocity, ft/sec |
| x, y, z | position components, ft |
| $\alpha$ | angle of attack, ° or rads |
| $\beta$ | sideslip angle, ° or rads |
| $\gamma$ | ratio of specific heats |
| $\delta\alpha$ | angle of attack calibration, ° |
| $\delta\beta$ | sideslip angle calibration, ° |
| $\varepsilon$ | calibration factor |
| $\lambda$ | cone angle, rads |
| $\phi$ | clock angle, rads |
| $\theta$ | total flow inclination angle, rads |
| $\rho$ | density, slugs |

| Vectors | |
| --- | --- |
| p | pressure readings, psf |
| P | predicted pressure readings, psf |
| r | radius vector, ft |
| $V_\infty$ | freestream velocity vector, ft/sec |
| x | state vector |

| Matrices | |
| --- | --- |
| J | Jacobian |
| R | pressure measurement covariant matrix |
| n | pressure model matrix |

Figure 1:
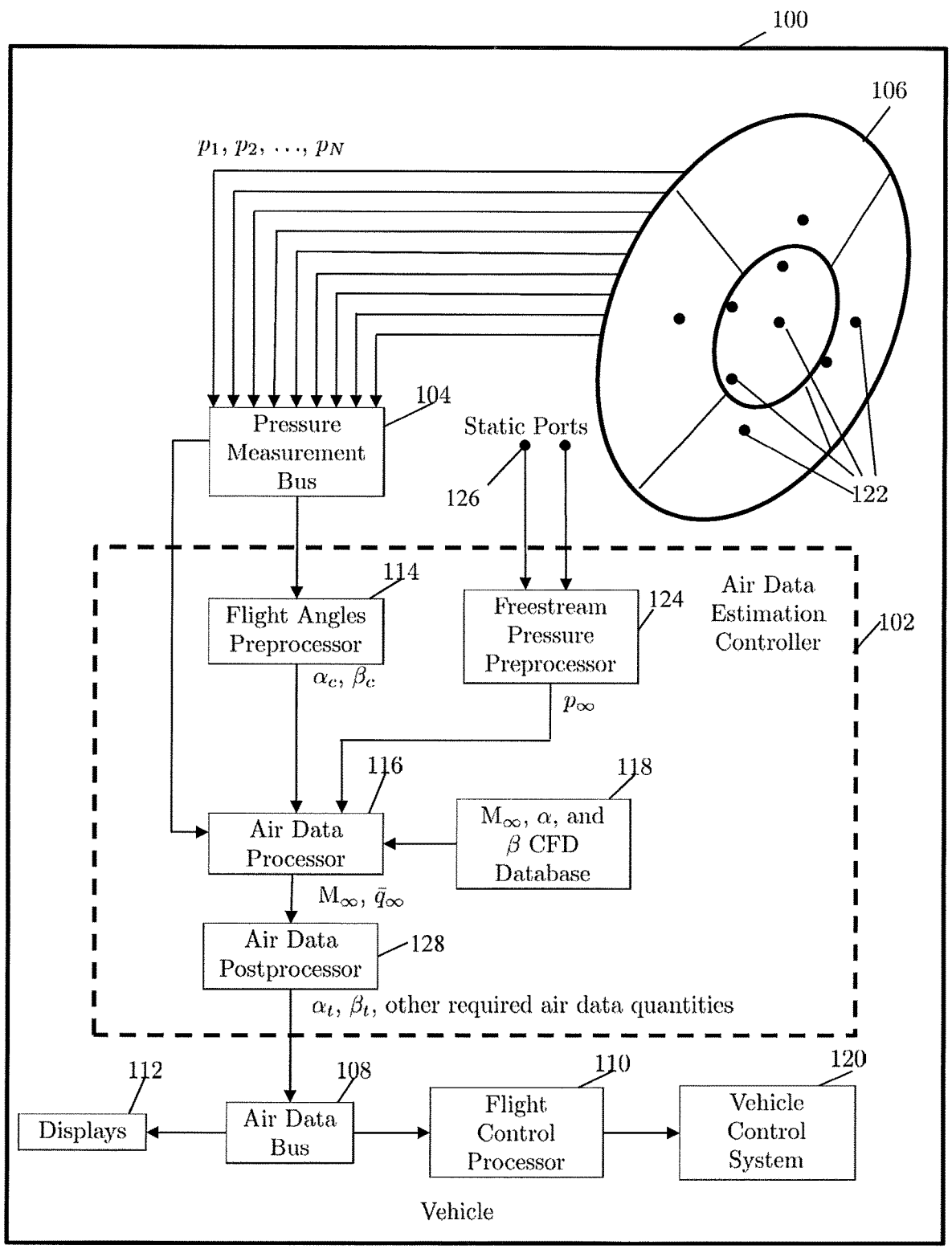
FIG. 1 is a block diagram illustrating a system hardware architecture in accordance with an exemplary embodiment.

FIG. 1 shows a vehicle guidance system for a vehicle 100 in accordance with an exemplary embodiment. In an exemplary embodiment, the vehicle guidance system is a FADS system. The vehicle guidance system of the present disclosure allows for a real-time in-flight computation of flight parameters with greater flexibility of pressure sensor placement on a vehicle 100. The vehicle 100 can be, for example, an aircraft (e.g., airplane, jet, drone, etc.), spacecraft (e.g., space shuttle, etc.), missile, any other vehicle or device capable of flight, a submarine, any other vehicle or device capable of moving under water, etc. The vehicle guidance system includes a plurality of surface-mounted pressure sensors 122 (e.g., $122_1, 122_2, \ldots, 122_N$) configured to be mounted on a vehicle 100, each sensor 122 being configured to detect a surface pressure distribution $p_1, p_2, \ldots, p_N$ for a location of each such sensor 122 when placed on a vehicle 100. The vehicle guidance system provides flexibility in the placement of the surface-mounted pressure sensors 122 as they do not need to be aligned along the vertical meridian of the nose or heat shield of the vehicle as explained below. The exemplary embodiment of FIG. 1 shows nine surface-mounted pressure sensors 122, but the number of sensors can be any number. In a non-limiting embodiment, there are at least four surface-mounted pressure sensors 122. In a non-limiting embodiment, there are at least seven surface-mounted pressure sensors 122.

The vehicle guidance system employs a potential flow model to obtain the effective flight angles; however, the requirements on port placement are not restrictive, allowing for configurations that are considered optimal for a FADS. Once the flight angles are known, iteration is used to capture the requisite pressures and Mach number. Finally, with the Mach number known, the true flight angles are computed. The potential flow model of the present disclosure can be used as either a real-time, in-flight computation or for post-flight trajectory reconstruction.

Figure 2:
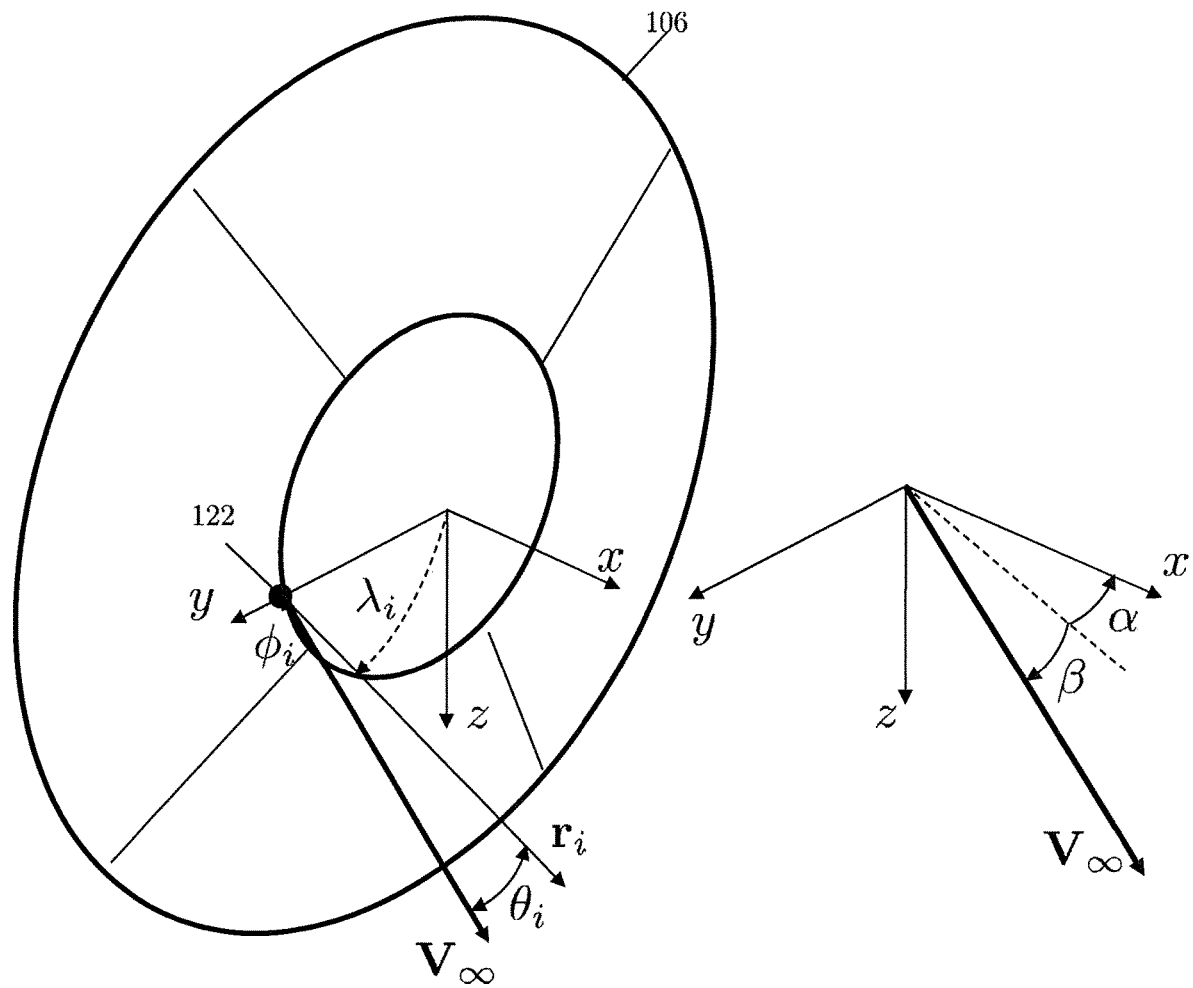
FIG. 2 is illustrates a portion of a vehicle body in accordance with an exemplary embodiment.

FIG. 2 shows the geometry of the vehicle guidance system. The hemispherical surface can be a portion of the vehicle body 106 which can be, for example, the nose of the vehicle 100, heat shield of a re-entry capsule, or any other portion of the vehicle body. The x-axis, y-axis, and z-axis as discussed herein are defined as shown in FIG. 2. The present disclosure is not limited to this orientation of axes, and the axes could be tilted any number of degrees in any direction. The location of each surface-mounted pressure sensor 122 on the vehicle body (e.g., nose of an air vehicle) is referenced by the body axis which has the x-axis pointing forward through the nose of the vehicle 100, the z-axis pointing down toward the Earth, and the y-axis pointing out the right side of the vehicle 100 to complete the right-handed triad. For example, if the vehicle 100 was an airplane, the y-axis would be in the direction of the right wing. The clock angle subtends from the point of symmetry on the nose to the latitude of the surface-mounted pressure sensor 122. The clock angle begins at the bottom of the vehicle 100 on the plane of symmetry and moves in a clockwise fashion to the location of the surface-mounted pressure sensor 122. The wind axis is used to define the angle of attack α and the sideslip angle β. The sideslip angle β is measured positive from the x-z plane, and is positive with a right-hand rotation about the z-axis. The angle of attack α is obtained in the x-z plane, and is measured positive with a right-hand rotation about the y-axis. Any point on the hemispherical surface is described by two angles, the cone angle $\lambda_h$ and the clock angle $\Phi_i$.

The position of the $i^{th}$ pressure port (e.g., pressure sensor) is determined from the cone angle $\lambda_i$ and the clock angle $\phi_i$, with the radius vector $r_i$ obtained from $$r_i = \begin{bmatrix} x\cos\lambda_i \\ y\sin\phi_i\sin\lambda_i \\ z\cos\phi_i\sin\lambda_i \end{bmatrix} \quad (1)$$

The velocity vector is given by $$V_\infty = \begin{bmatrix} u\cos\alpha\cos\beta \\ v\sin\beta \\ w\sin\alpha\cos\beta \end{bmatrix}. \quad (2)$$

The total flow inclination angle is the angle between the radius vector and the velocity vector, and is obtained by taking the dot product of the two vectors and dividing by their magnitudes, resulting in $$\cos\theta_i = \cos\alpha\cos\beta\cos\lambda_i + \sin\beta\sin\phi_i\sin\lambda_i + \sin\alpha\cos\beta\cos\phi_i\sin\lambda_i. \quad (3)$$

From incompressible potential flow theory for flow over a sphere, the pressure distribution is given by $$C_p(\theta) = -5/4 + 9/4\cos^2\theta. \quad (4)$$

To account for a non-spherical nose shape, compressibility, and afterbody effects (e.g., sidewash and downwash, etc.), the coefficients assume arbitrary values, while still retaining the basic form of the model, $$C_p(\theta) = A + B\cos^2\theta. \quad (5)$$

The values of A and B need to be determined for each vehicle, and the boundary condition at θ=0 must be satisfied. Hence, $$C_p(0) = \frac{q_c}{q_\infty} = A + B, \quad (6)$$

where $q_c$ is the difference between the total pressure of the flow field and the free stream pressure ($q_c = p_0 - p_\infty$) and is termed the compressible dynamic pressure. If the nonlinear effects are modeled into a calibration parameter ε, the boundary condition can be satisfied by setting $$A = \frac{q_c}{q_\infty}\varepsilon, \quad (7)$$

and $$B = \frac{q_c}{q_\infty}(1 - \varepsilon). \quad (8)$$

The calibration parameter E is determined from computational fluid dynamics (CFD), wind tunnel experiments, flight test, or a combination of the three. With these values, the pressure distribution becomes $$C_p(\theta) = \frac{q_c}{q_\infty}(\cos^2\theta + \varepsilon\sin^2\theta). \quad (9)$$

Noting that the pressure coefficient for each pressure port i is also given by $$C_p(\theta_i) = \frac{p_i - p_\infty}{q_\infty}, \quad (10)$$

the pressure model required for the FADS becomes $$p_i = q_c(\cos^2\theta_i + \varepsilon\sin^2\theta_i) + p_\infty. \quad (11)$$

The calibration parameter is retained in this formulation, but as will be shown in the next section, ε is never evaluated. It is sufficient that ε exists.

With strategic differencing, the pressure terms and calibration parameter can be removed from Eq. (11), that is $$\frac{p_i - p_j}{p_j - p_k} = \frac{\cos^2\theta_i - \cos^2\theta_j}{\cos^2\theta_j - \cos^2\theta_k}. \quad (12)$$

Rearranging terms, Eq. (12) is written as $$P_{ji}\cos^2\theta_k + P_{ik}\cos^2\theta_j + P_{kj}\cos^2\theta_i = 0, \tag{13}$$

where $$P_{ji} = p_j - p_i, \tag{14a}$$

$$P_{ik} = p_i - p_k, \tag{14b}$$

$$P_{kj} = p_k - p_j. \tag{14c}$$

Equation (13) is the triples equation, although it will be written in various forms throughout this disclosure. If, for example, the three pressure port measurements being differenced are on the vertical meridian where the clock angle $\phi$ is either zero or 180°, then $\sin\phi = 0$ and $\cos\phi = \pm 1$. With this simplification, all terms with $\beta$ can also be eliminated from the triples equation. The triples equation then reduces to $$\tan 2\alpha = \frac{A}{B}, \tag{15}$$

where $$A = P_{ji}\sin^2\lambda_k + P_{ik}\sin^2\lambda_j + P_{kj}\sin^2\lambda_i, \tag{16a}$$

$$B = \pm P_{ji}\sin\lambda_k\cos\lambda_k \pm P_{ik}\sin\lambda_j\cos\lambda_j \pm P_{kj}\sin\lambda_i\cos\lambda_i. \tag{16b}$$

The differencing for determining $\alpha$ occurs on the vertical meridian. The ability to calculate $\alpha$ directly is due not simply to strategic differencing, but also to strict pressure port placement. Once $\alpha$ is determined, the triples equation can again be rewritten, this time to solve for $\beta$ from $$\hat{c}_2\tan^2\beta + 2\hat{c}_1\tan\beta + \hat{c}_0 = 0, \tag{17}$$

where $$\hat{c}_2 = P_{ji}B_k^2 + P_{ik}B_j^2 + P_{kj}B_i^2, \tag{18a}$$

$$\hat{c}_1 = P_{ji}A_kB_k + P_{ik}A_jB_j + P_{kj}A_iB_i, \tag{18b}$$

$$\hat{c}_0 = P_{ji}A_k^2 + P_{ik}A_j^2 + P_{kj}A_i^2, \tag{18c}$$

and $$A_i = \cos\alpha\cos\lambda_i + \sin\alpha\cos\phi_i\sin\lambda_i \; B_i = \sin\phi_i\sin\lambda_i, \tag{19a}$$

$$A_j = \cos\alpha\cos\lambda_j + \sin\alpha\cos\phi_j\sin\lambda_j \; B_j = \sin\phi_j\sin\lambda_j, \tag{19b}$$

$$A_k = \cos\alpha\cos\lambda_k + \sin\alpha\cos\phi_k\sin\lambda_k \; B_k = \sin\phi_k\sin\lambda_k. \tag{19c}$$

Now the differencing cannot occur solely on the vertical meridian. The solutions of Eq. 18 are $$\beta = \begin{cases} \tan^{-1}\left(-\frac{1}{2}\frac{\hat{c}_0}{\hat{c}_1}\right) & \hat{c}_2 = 0, \\ \tan^{-1}\left[-\left(\frac{\hat{c}_1}{\hat{c}_2}\right) \pm \sqrt{\left(\frac{\hat{c}_1}{\hat{c}_2}\right)^2 - \left(\frac{\hat{c}_1}{\hat{c}_2}\right)}\right] & \hat{c}_2 \neq 0 \end{cases}, \tag{20}$$

where the root chosen in the second case is the one closest to zero.

While a powerful real-time algorithm, the Triples Algorithm relies on placing pressure ports exactly on the vertical meridian. An iterative approach is required in order to use the triples equation when the limitation of pressure port placement is removed. However, differencing must still occur primarily parallel to the x-z plane (termed notional vertical) for determining $\alpha$, and primarily parallel to the x-y plane (termed notional horizontal) for determining $\beta$. To begin the iterations, a guess is made for $\beta$. Since the sideslip angle is typically small, a reliable initial guess to start this algorithm is $\beta = 0$. For a trajectory, the previously converged value of $\beta$ is used to start the iterations.

For a given value of $\beta$, define the following parameters from Eq. (3), $$a_i = \cos\beta\cos\lambda_i \; a_j = \cos\beta\cos\lambda_j \; a_k = \cos\beta\cos\lambda_k, \tag{21a}$$

$$b_i = \sin\beta\sin\phi_i\sin\lambda_i \; b_j = \sin\beta\sin\phi_j\sin\lambda_j \; b_k = \sin\beta\sin\phi_k\sin\lambda_k, \tag{21b}$$

$$c_i = \cos\beta\cos\phi_i\sin\lambda_i \; c_j = \cos\beta\cos\phi_j\sin\lambda_j \; c_k = \cos\beta\cos\phi_k\sin\lambda_k. \tag{21c}$$

After some algebra and judicial use of trigonometric identities, it can be shown that the triples equation becomes $$c_4\tan^4 1/2\alpha + c_3\tan^3 1/2\alpha + c_2\tan^2 1/2\alpha + c_1\tan 1/2\alpha + c_0 = 0, \tag{22}$$

where $$c_4 = P_{ji}A_k + P_{ik}A_j + P_{kj}A_i, \tag{23a}$$

$$c_3 = P_{ji}B_k + P_{ik}B_j + P_{kj}B_i, \tag{23b}$$

$$c_2 = P_{ji}C_k + P_{ik}C_j + P_{kj}C_i, \tag{23c}$$

$$c_1 = P_{ji}D_k + P_{ik}D_j + P_{kj}D_i, \tag{23d}$$

$$c_0 = P_{ji}E_k + P_{ik}E_j + P_{kj}E_i, \tag{23e}$$

and $$A_i = (a_i - b_i)^2 \; A_j = (a_j - b_j)^2 \; A_k = (a_k - b_k)^2, \tag{24a}$$

$$B_i = 4c_i(b_i - a_i) \; B_j = 4c_j(b_j - a_j) \; B_k = 4c_k(b_k - a_k), \tag{24b}$$

$$C_i = 2(b_i^2 + 2c_i^2 - a_i^2) \; C_j = 2(b_j^2 + 2c_j^2 - a_j^2) \; C_k = 2(b_k^2 + 2c_k^2 - a_k^2), \tag{24c}$$

$$D_i = 4c_i(b_i + a_i) \; D_j = 4c_j(b_j + a_j) \; D_k = 4c_k(b_k + a_k), \tag{24d}$$

$$E_i = (a_i + b_i)^2 \; E_j = (a_j + b_j)^2 \; E_k = (a_k + b_k)^2. \tag{24e}$$

Figure 9:
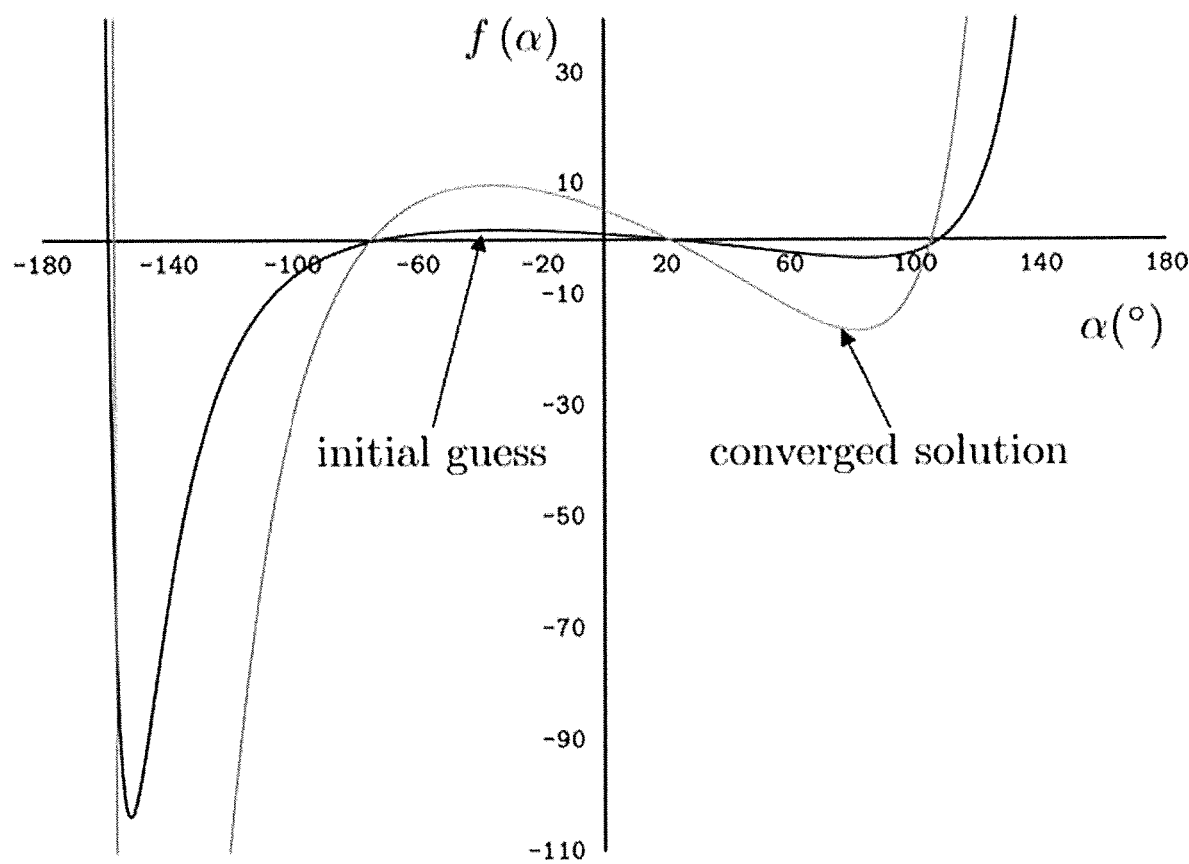
FIG. 9 illustrates an exemplary graph of a polynomial.

Equation (22) has been found to have the desirable properties of well-spaced roots, approximately 90° apart, and well behaved near the root of interest (see FIG. 9). Also, the singularities have been moved to ±180°. Quadratic convergence can also be achieved for evaluating the root of interest using the Newton-Raphson method.

The potential flow model of the present disclosure averages the results of every flight angle obtained from each differencing. For example, if there are five ports in the notional vertical, then there are $$\frac{5!}{3!(5-3)!} = 10 \tag{25}$$

angles of attack to average. As each value of $\alpha$ is computed, a check is made for convergence to a real number. If a NaN (not a number) is detected or convergence is not achieved in a set number of iterations, the iterations are stopped, and that value is scored as invalid. After all $\alpha$'s are computed, only the valid angles of attack are averaged. Additionally, the standard deviation is computed. A second averaging of the valid α's is made, but outliers (values outside ±3σ) are removed from the averaging. The same technique is used when averaging β.

Eqs. (20) and (22) provide effective flight angles, $\alpha_e$ and $\beta_e$. These angles will differ from the true flight angles, $\alpha_t$ and $\beta_t$, since the potential flow model from which the equations were derived is only approximate. A calibration procedure is used in order to retrieve the true flight angles from Eqs. (20) and (22). A database of the coefficients of pressure at each of the port locations and selected Mach numbers, angles of attack, and sideslip angles is used. Using the above equations, the effective angles are computed, and the calibration corrections are obtained from $$\delta\alpha(M_\infty,\alpha_e) = \alpha_e - \alpha_t, \quad (26a)$$

$$\delta\beta(M_\infty,\alpha_e,\beta_e) = \beta_e - \beta_t. \quad (26b)$$

Typically, for the Orion database, a fourth order polynomial is required to approximate the relationship between the calibration angle $\delta\alpha$ and the effective angle of attack $\alpha_e$ at each Mach number. Once a Mach number is determined, an interpolation is performed on the coefficients of the fourth order polynomial in order to determine the $\delta\alpha$. This calibration angle is subtracted from the effective angle of attack in order to determine the true angle of attack $\alpha_t$.

Next, determining the true sideslip angle $\beta_t$ will be explained. At each Mach number, very different curves exist between each calibration angle $\delta\beta$ and the effective sideslip angle $\beta_e$ at each true angle of attack $\alpha_t$. Additionally, these curves are nearly linear at subsonic and hypersonic Mach numbers, but are cubic at transonic to high supersonic Mach numbers. In order to simplify computations, the relationship between the coefficients of the curves between the sideslip calibration angles and the effective sideslip angles at each Mach number was determined as a polynomial with the true angle of attack. For any Mach number in the database, the correlation takes the form $$\delta\beta = \sum_{n=0}^{N} b_n \beta_e^n, \quad (27)$$

where $$b_0 = \sum_{m=0}^{M} a_{0,m} \alpha_t^m \quad (28)$$

$$\vdots \quad (29)$$

$$b_N = \sum_{m=0}^{M} a_{N,m} \alpha_t^m. \quad (30)$$

The stored coefficients $a_{n,m}$ are now functions of just Mach number and $\alpha_t$, and the calibration angle $\delta\beta$ is determined at the Mach numbers in the database above and below the given Mach number through the following procedure. The coefficients $a_{n,m}$ are determined at each Mach number, and with the coefficients $a_{n,m}$, the coefficients $b_n$ are determined. From the coefficients $b_n$ and the effective sideslip angles, the calibration angles at each Mach number are determined. The calibration angle $\delta\beta$ is determined by interpolating between the two Mach numbers. The calibration angle is subtracted from the effective sideslip angle to obtain the true sideslip angle $\beta_t$.

The calibrations cannot be applied until the Mach number is obtained, and the procedure to do so follows. Typically, in a Pitot-static system, the two pressures that are directly measured are the total pressure, $p_0$, and the freestream pressure, $p_\infty$. However, to close the FADS equations, any two pressures with a Mach number relationship are sufficient. As with the Mars Entry Atmospheric Data System (MEADS) and the Orion EFT-1 FADS, dynamic pressure was chosen over the compressible dynamic pressure. Since dynamic pressure can be expressed as either $$\bar{q} = 1/2 \rho_\infty V_\infty^2, \text{ or} \quad (31a)$$

$$\bar{q} = 1/2 \gamma p_\infty M_\infty^2. \quad (31b)$$

Both equations are extremely useful for freestream pressure and Mach number determination, and are far easier to implement than the complicated relationship between the total pressure and freestream pressure.

Figure 4A:
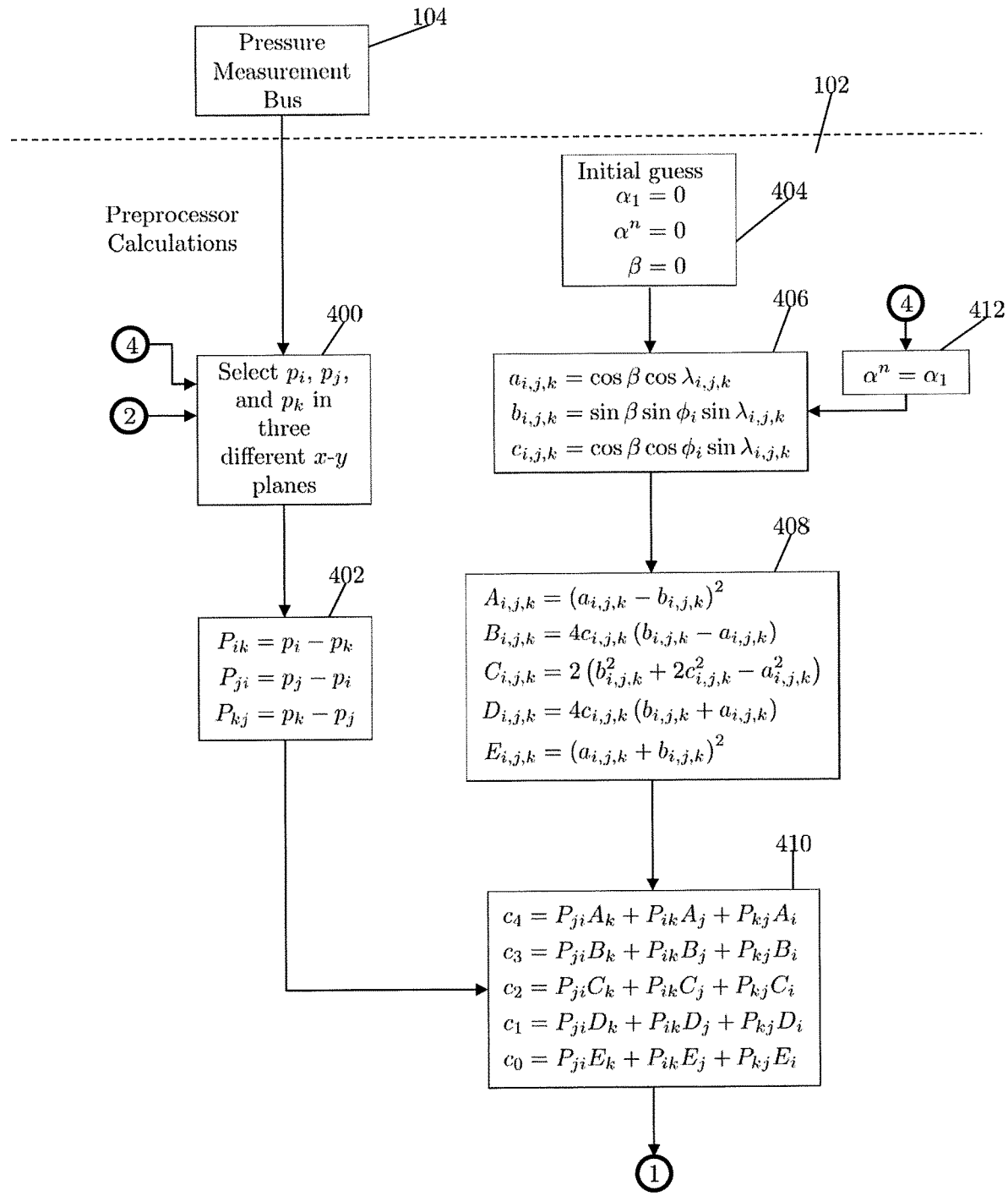
FIGS. 4A-4E are flow charts further illustrating the exemplary method of FIG. 3.

Two approaches are available for calculating the freestream quantities. In the first approach, FADS pressure data are used to estimate the freestream and dynamic pressure (in an exemplary embodiment, only FADS pressure data are used). This approach is useful for Mach numbers less than about Mach 2 and is shown in FIG. 4D. For high Mach numbers, where $\bar{q}_\infty \gg p_\infty$, another approach is required. In the second approach FADS pressure data and aiding (e.g., GPS aiding) are used. In the second approach, FADS pressure data are used to obtain $\bar{q}_\infty$. Either the inertial velocity, balloon data, or an atmosphere model are used to estimate $p_\infty$, or the freestream pressure can be estimated from the GPS altitude. This second approach is shown in FIG. 4E. In an exemplary embodiment, the first approach shown in FIG. 4D can be used as a backup to the second approach shown in FIG. 4E. That is, if you cannot use the second approach of FIG. 4E that uses pressure data and aiding, you can use the first approach of FIG. 4D. For example, if the vehicle 100 is operating in a GPS-denied environment. Thus, the first and second approach can be used in the same vehicle guidance system. Below Mach 2, the first approach of FIG. 4D will likely provide a valid Mach number. The second approach of FIG. 4E can be used above Mach 1 and provides reliable values. For example, the second approach of FIG. 4E has obtained reliable values at Mach 20. The second approach of FIG. 4E is better suited for a real-time solution, particularly at high Mach numbers (e.g., above Mach 1). The second approach can also be used if the first approach fails, which could be at high altitudes and supersonic to hypersonic airspeeds.

The first approach using FADS pressure data will be discussed next. The atmospheric state vector is defined as $x=[\bar{q}, p_\infty]^T$. For each pressure sensor, the pressure model takes the form $$P_i = \bar{q}_\infty C_{p_i}(M_\infty, \alpha_e, \beta_e) + p_\infty, \quad (32)$$

where the pressure coefficient $C_p$ is a function only of the freestream Mach number and the effective flight angles. One of the benefits of employing this pressure model is the calibration parameter, ε, need not be computed. Additionally, the database 118 of the coefficient of pressures, which is obtained from Computational Fluid Dynamics (CFD) or wind tunnels with true flight angles, must be remapped to the effective flight angles. The pressure model can be written in vector notation as $$P = \Pi x, \quad (33)$$

where $$\Pi = \begin{bmatrix} C_p(M_\infty, \theta_1) & 1 \\ \vdots & \vdots \\ C_p(M_\infty, \theta_N) & 1 \end{bmatrix}. \quad (34)$$

If the vector of N pressure readings at time t is defined as p, the pressure measurement model can be rewritten as $$p = P + \in, \quad (35)$$

where $\in$ represents the pressure measurement errors. A linearization of the pressure model is represented by $$p \approx P(\bar{x}) + \frac{\partial P}{\partial x}\bigg|_{x=\bar{x}} (x - \bar{x}) + \epsilon, \quad (36)$$

where $\bar{x}$ is a reference state. Let J represent the Jacobian, $$J(\bar{x}) = \frac{\partial P}{\partial x}\bigg|_{x=\bar{x}}. \quad (37)$$

Then $$p - P + J(\bar{x})\bar{x} = J(\bar{x})x + \in. \quad (38)$$

By defining $$y = p - P + J(\bar{x})\bar{x}, \quad (39)$$

then Eq. (38) becomes $$y = J(\bar{x})x + \in. \quad (40)$$

Per the Gauss-Markov theorem, the best linear unbiased estimate of x is the weighted least-squares solution $$\hat{x} = (J^T R^{-1} J)^{-1} J^T R^{-1} y, \quad (41)$$

where R is the pressure measurement covariance matrix. Keeping in mind that the database of $C_p$ is a function only of Mach number, $\alpha_e$, and $\beta_e$, the Jacobians are given by $$J_{i,1} = \frac{\partial p_i}{\partial \bar{q}_\infty} = C_{p_i}(M_\infty, \alpha_e, \beta_e), \quad (42a)$$

$$J_{i,2} = \frac{\partial p_i}{\partial p_\infty} = 1. \quad (42b)$$

With these definitions of the Jacobians, the vector y reduces to the measured pressures p. Additionally, if the errors in the pressure sensors are considered independent of each other, the covariance matrix reduces to the identity matrix multiplied by an error estimate. The matrix $(J^T R J)$ is easily inverted, the error estimate is eliminated, and the solutions for the freestream values are simply $$\bar{q}_\infty = \frac{N\left(\sum_{i=1}^N C_{p_i} p_i\right) - \left(\sum_{i=1}^N C_{p_i}\right)\left(\sum_{i=1}^N p_i\right)}{N\left(\sum_{i=1}^N C_{p_i}^2\right) - \left(\sum_{i=1}^N C_{p_i}\right)^2}, \quad (43a)$$

$$p_\infty = \frac{\left(\sum_{i=1}^N C_{p_i}^2\right)\left(\sum_{i=1}^N p_i\right) - \left(\sum_{i=1}^N C_{p_i}\right)\left(\sum_{i=1}^N C_{p_i} p_i\right)}{N\left(\sum_{i=1}^N C_{p_i}^2\right) - \left(\sum_{i=1}^N C_{p_i}\right)^2}. \quad (43b)$$

All that is required to get the iterations started is a guess of the Mach number. The Mach number is updated from $$M_\infty = \sqrt{\frac{2\bar{q}_\infty}{\gamma p_\infty}}. \quad (44)$$

In FIG. 4D, Eqs. (43a) and (43b) are used in step 480. Eq. (44) is used in step 482. These steps will be described in greater detail below.

The second approach, which uses FADS pressure data and aiding will be discussed next. For this approach, the vehicle guidance system can determine flight angles at high altitudes and high Mach numbers (e.g., above Mach 1). The differencing employed by this approach also provides the simplest of filters to remove noise. If it is assumed that the noise from each pressure sensor is of the same order of magnitude, than differencing should also provide more accurate predictions for pressure. For example, for the $i^{th}$ and $j^{th}$ pressure sensors, $$p_i = \bar{q}_\infty C_{p_i}(M_\infty, \alpha_e, \beta_e) + p_\infty, \quad (45a)$$

$$p_j = \bar{q}_\infty C_{p_j}(M_\infty, \alpha_e, \beta_e) + p_\infty. \quad (45b)$$

Letting $$\Delta p_{ij} = p_i - p_j, \quad (46a)$$

$$\Delta C_{p_{ij}} = C_{p_i} - C_{p_j}, \quad (46b)$$

and differencing Eqs. (45a) and (45b) results in $$\Delta p_{ij} = \bar{q}_\infty \Delta C_{p_{ij}}, \quad (47)$$

with the least squares solution of $$\bar{q}_\infty = \frac{\sum_{i=1}^{N-1} \sum_{j=i+1}^{N} \Delta C_{p_{ij}} \Delta p_{ij}}{\sum_{i=1}^{N-1} \sum_{j=i+1}^{N} (\Delta C_{p_{ij}})^2}. \quad (48)$$

The freestream pressure is eliminated in the differencing. However, using inertial velocity, GPS altitude, a temperature profile, and winds aloft, an estimate of the freestream pressure $p_\infty$ is computed, and the Mach number is iterated until convergence. As in the first approach, a guess is made for the Mach number, but now the dynamic pressure is solved from Eq. (48). From the inertial velocity, GPS altitude, and winds aloft, provided by an atmosphere model or balloon data, an estimate of the true airspeed, $V_\infty$, is obtained, and $$\rho_\infty = \frac{2\bar{q}_\infty}{V_\infty^2}. \qquad (49)$$

From the GPS altitude and temperature profile, again provided by an atmosphere model or balloon data, the freestream pressure $p_\infty$ is obtained from $$p_\infty = \rho_\infty R T_\infty. \qquad (50)$$

A new estimate for the Mach number is obtained from Eq. (44), and the iterations continue until reaching a specified level of convergence. The second approach can also be used in real-time if the latest balloon data or atmosphere model is loaded into the vehicle 100 prior to re-entry. If balloon data are not available, reasonable results can still be obtained by converting the GPS altitude directly into a freestream pressure $p_\infty$ estimate.

In FIG. 1, the vehicle guidance system includes an air data estimation controller 102 connected to each of the plurality of surface-mounted pressure sensors 122. Each of the plurality of surface-mounted pressure sensors 122 are connected to a pressure measurement bus 104. The air data estimation controller 102 includes a preprocessor 114 that computes a calibrated angle of attack $\alpha_c$ and a calibrated sideslip angle $\beta_c$. These calibrated values are computed values that are estimates (e.g., close approximations). The calibrated values are then later converted to the true (i.e., real) angle of attack $\alpha_t$ and the true sideslip angle $\beta_t$. These true flight angles are used in conjunction with data (e.g., a table, etc.) stored in a database 118 to determine the remaining air data properties, for example, freestream pressure, freestream Mach number, etc. The pressure measurement bus 104 is connected to the preprocessor 114, and the pressure measurement bus 104 outputs the surface pressure distribution value associated with each of the surface-mounted pressure sensors 122 to the preprocessor 114, the air data processor 116, or other subsystems of the air data estimation controller 102.

In FIG. 1, the air data estimation controller 102 also includes an air data postprocessor 128 that receives the Mach number $M_\infty$ and the converged freestream dynamic pressure $\bar{q}_\infty$ from the air data processor 116. The air data postprocessor 128 computes the true angle of attack $\alpha_t$, the true sideslip angle $\beta_t$, and other air data quantities which are outputted to the air data bus 108. The air data estimation controller 102 also includes a freestream pressure preprocessor 124 that computes a freestream pressure $p_\infty$. The freestream pressure preprocessor 124 is shown in greater detail in FIG. 5. In an exemplary embodiment, the freestream pressure preprocessor 124 can receive pressure data from one or more static ports 126 located on the vehicle 100.

Figure 3:
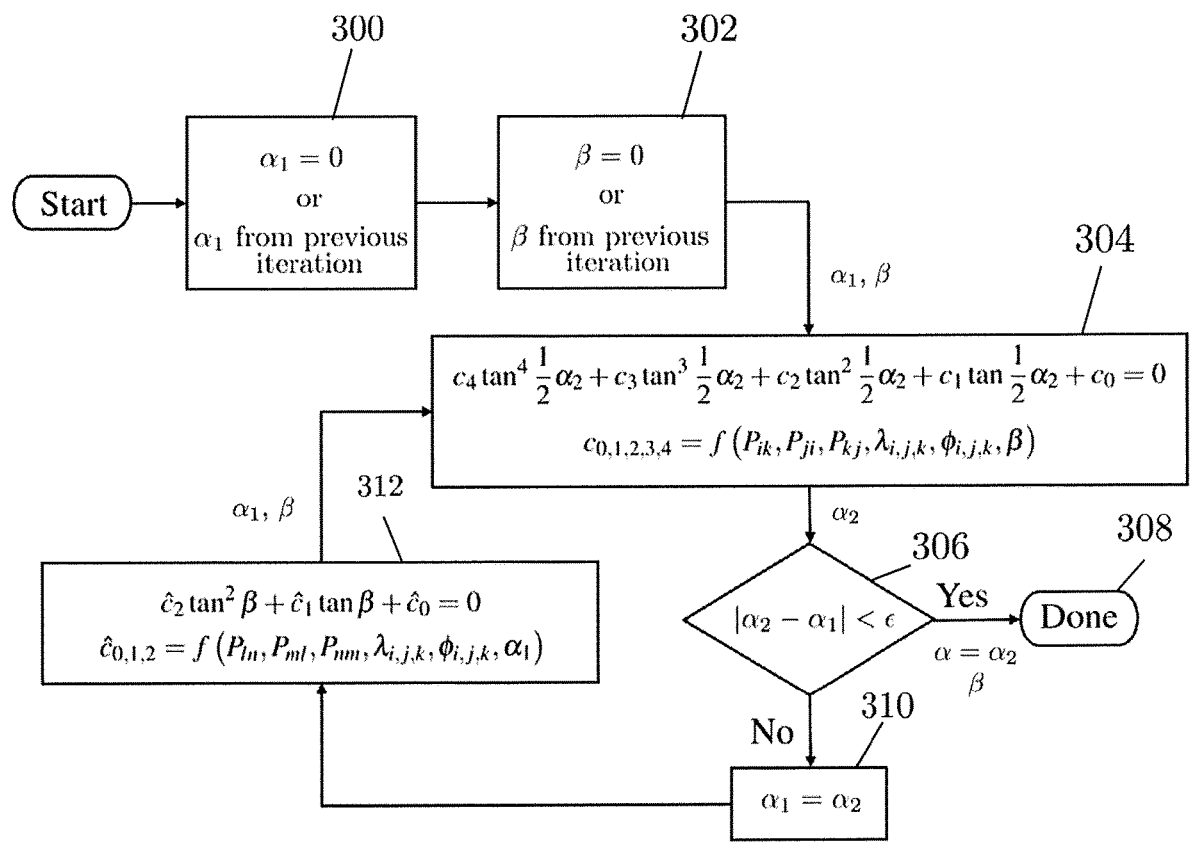
FIG. 3 is a flow chart illustrating a method according to an exemplary embodiment.

FIG. 3 illustrates an overview of steps performed by the preprocessor 114 in order to determine one or more angle of attack values $\alpha$ and one or more sideslip angles $\beta$. After the preprocessor 114 has determined one or more angle of attack values $\alpha$ and one or more sideslip angles $\beta$, the preprocessor 114 outputs one calibrated angle of attack $\alpha_c$ value and one calibrated sideslip angle $\beta_c$ as discussed below. In an exemplary embodiment, the preprocessor 114 is configured to set an initial value for angle of attack $\alpha_1$ and set an initial value for sideslip angle $\beta$ (see steps 300 and 302 of FIG. 3).

In an exemplary embodiment, the preprocessor 114 is configured to set the initial value for angle of attack $\alpha_1$ to zero and the initial value for sideslip angle $\beta$ to zero. Setting the initial value for the sideslip angle $\beta$ to zero is usually sufficient since the sideslip angle is typically small, but a value of a previous trajectory calculation speeds convergence of the sideslip angle. That is, a previously determined value of the sideslip angle by the preprocessor 114 can be used as the initial value for the sideslip angle $\beta$. Also, a previously determined value of the angle of attack by the preprocessor 114 can be used as the initial value for the angle of attack $\alpha_1$.

Figure 4B:
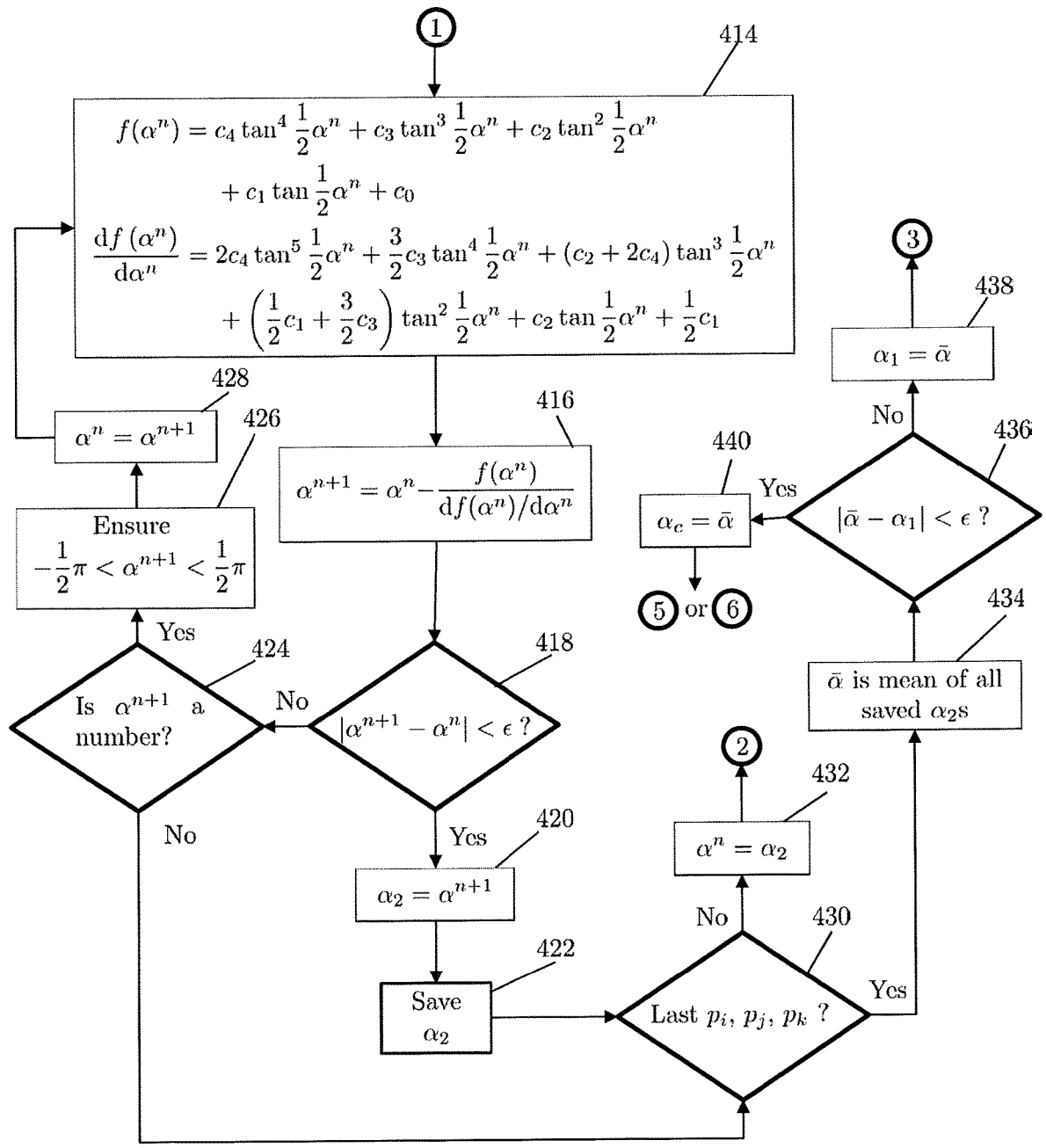

The preprocessor 114 is configured to determine a converged value for the angle of attack (e.g., $\alpha_c$ that is equal to $\bar{\alpha}$; see step 440 of FIG. 4B) using the initial value for angle of attack $\alpha_1$, the initial value for sideslip angle $\beta$, and surface pressure distribution values of one or more first sets of three surface-mounted pressure sensors 122, each first set of three-surface mounted pressure sensors are located among three different geometric planes that are parallel to the ground. In other words, the first set of three surface-mounted pressure sensors 122 are each located in different x-y planes (i.e., three different x-y planes), where the x-axis and y-axis are defined as shown in FIG. 2. In an exemplary embodiment, the first set of three surface-mounted pressure sensors 122 are located among two different geometric planes that are parallel to the ground.

In step 304 of FIG. 3, the coefficients of the fourth order trigonometric polynomial are computed with the initial value for the sideslip angle $\beta$, and a Newton-Raphson method is used to iterate for a new value of the angle of attack $\alpha_2$. In step 306, a check is performed to determine whether the initial value for angle of attack $\alpha_1$ and the new value for the angle of attack $\alpha_2$ has converged. In step 308, if the absolute value of the difference of $\alpha_1$ and $\alpha_2$ is less than $\varepsilon$ (a predetermined tolerance value), then the angle of attack and sideslip angle computations are done. If the determination of step 306 is not yes, the initial value for the angle of attack $\alpha_1$ is updated (step 310), and the value of the sideslip angle $\beta$ is updated from the new angle of attack value (step 312). The iterations continue until the angle of attack value converges (i.e., Yes in step 306 is obtained).

Figure 4C:
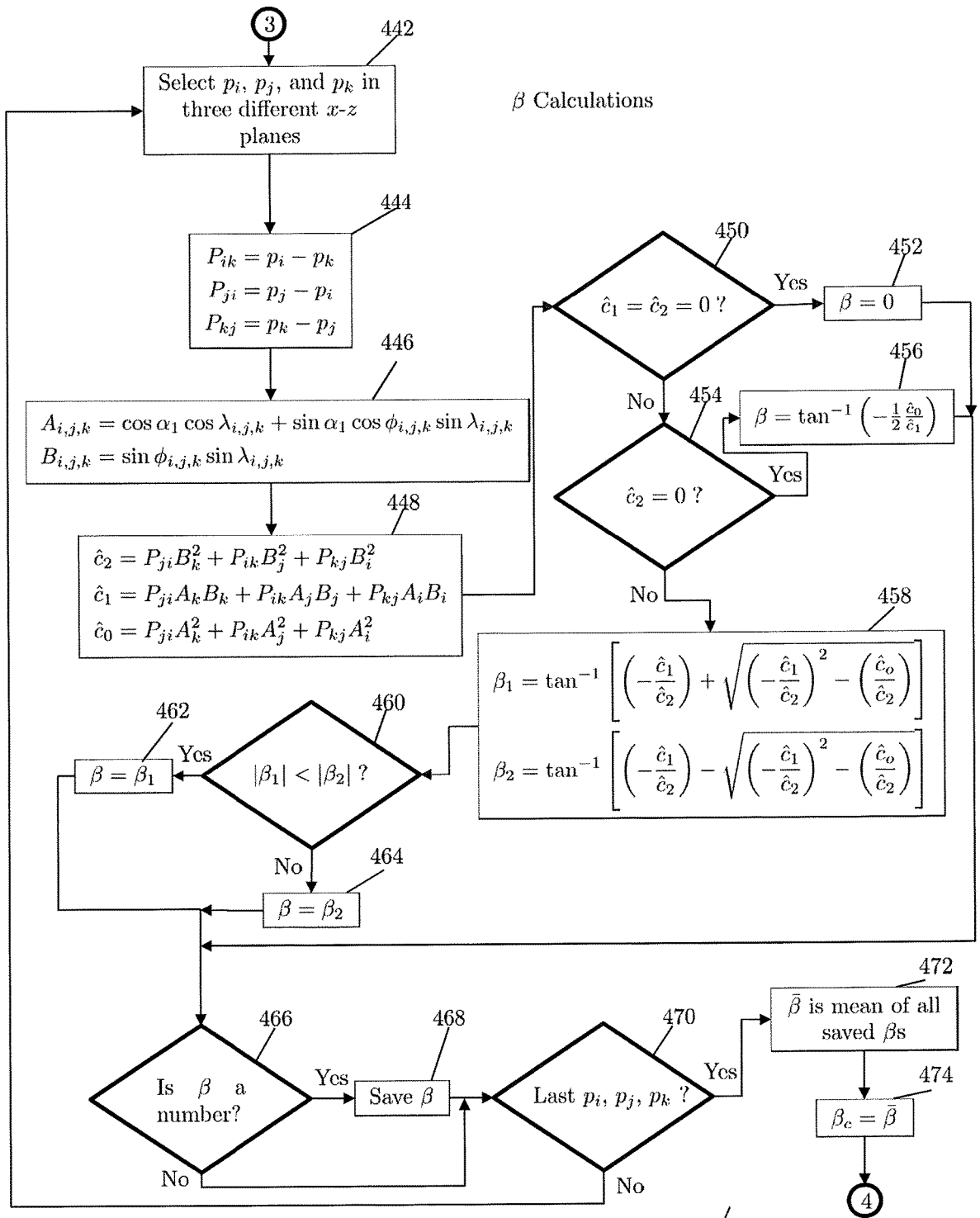
Figure 4D:
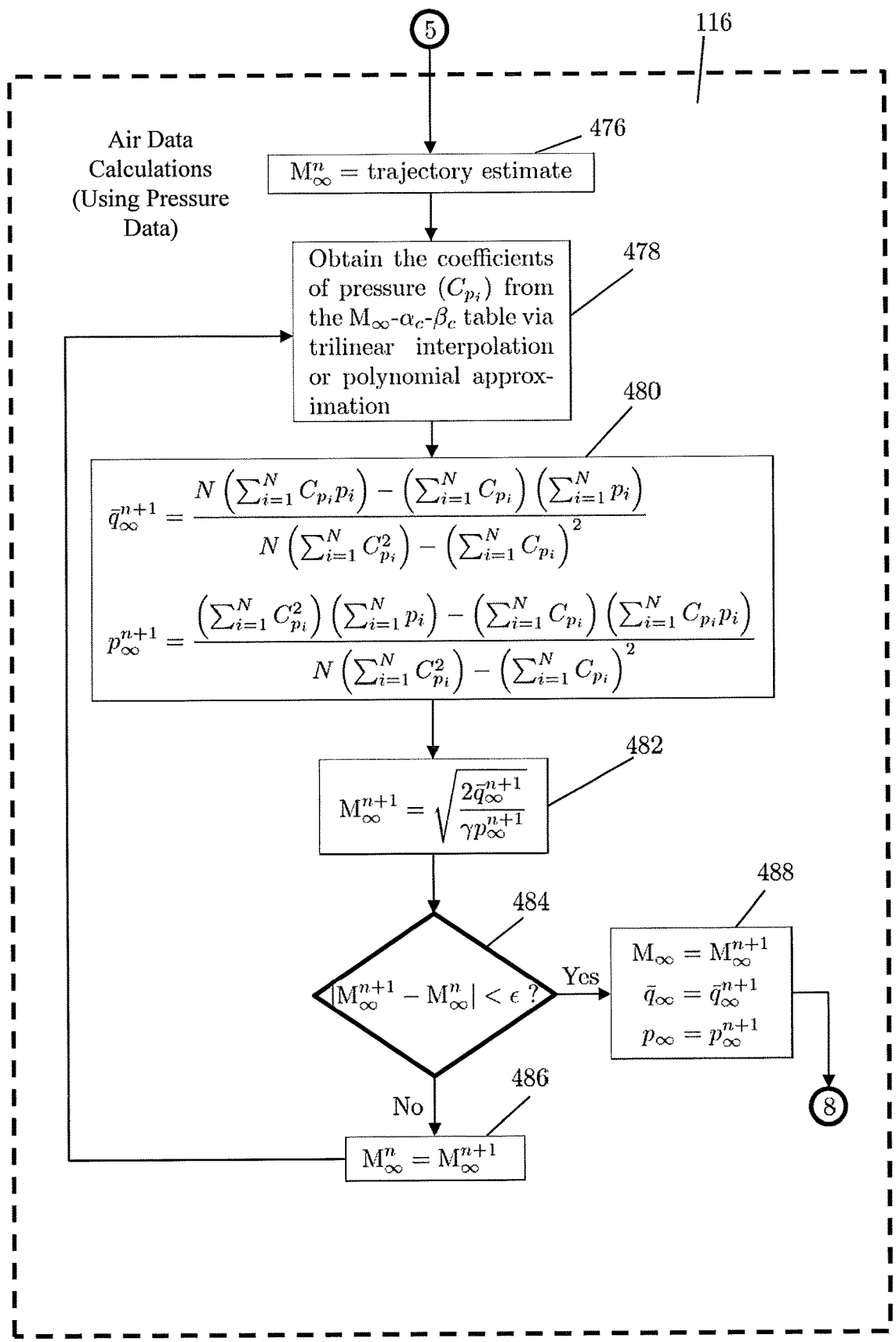
Figure 4E:
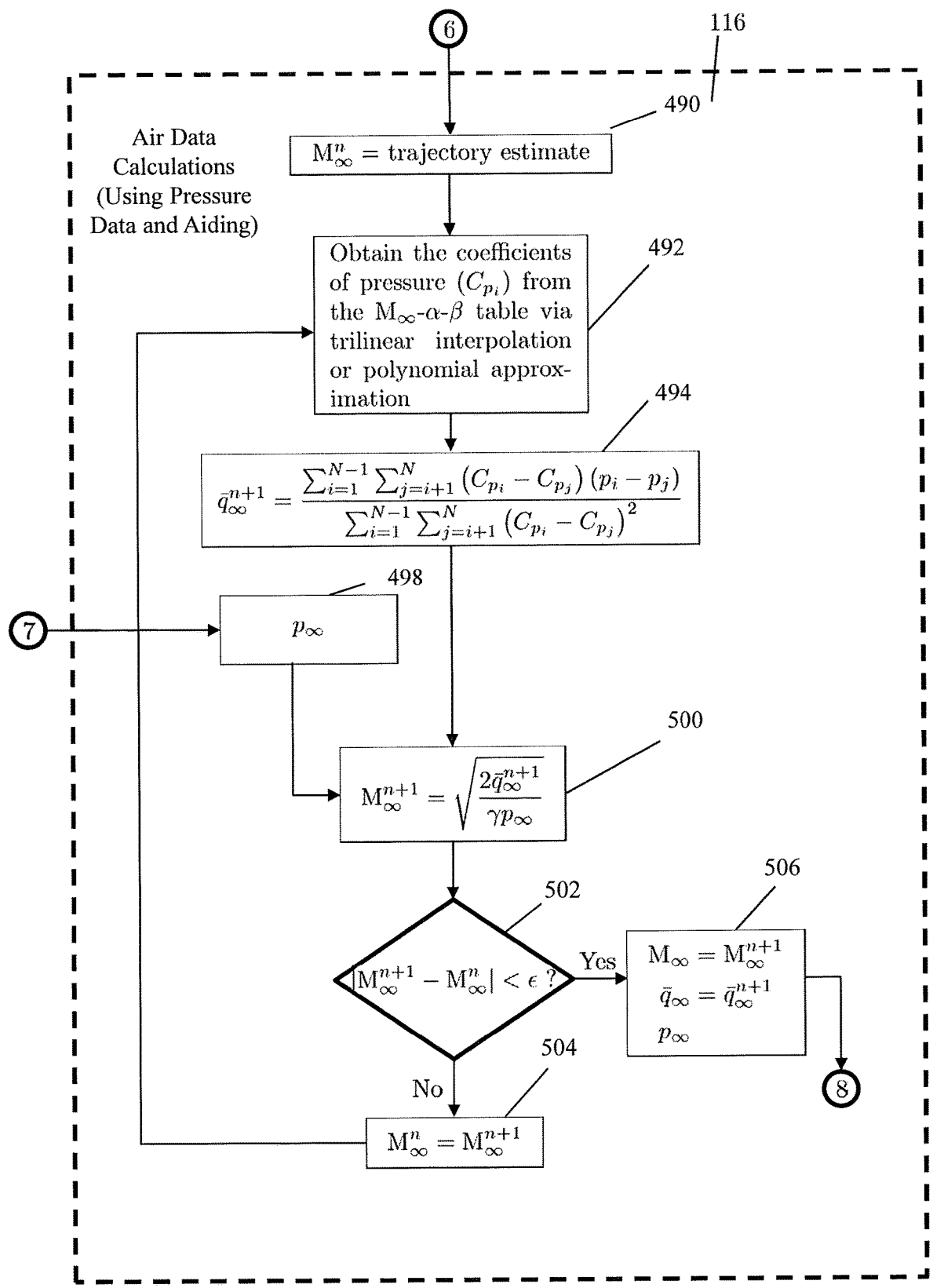

In FIG. 1, the preprocessor 114 is configured to provide (e.g., determine, calculate, etc.) a converged sideslip angle value (e.g., $\beta_c$ that is equal to $\bar{\beta}$; see step 474 of FIG. 4C) based on the converged value for the angle of attack and surface pressure distribution values of one or more second sets of three surface-mounted pressure sensors 122, each second set of three-surface mounted pressure sensors are located among three different geometric planes that are perpendicular to the ground. In other words, the second set of three surface-mounted pressure sensors 122 are each located in different x-z planes, where the x-axis and z-axis are defined as shown in FIG. 2. In an exemplary embodiment, the second set of three surface-mounted pressure sensors 122 are located among two different geometric planes that are perpendicular to the ground.

In an exemplary embodiment, the first and second sets of pressure sensors 122 differ by at least one pressure sensor 122.

In an exemplary embodiment, the converged value for the angle of attack is an average of angle of attack values previously determined by the preprocessor 114.

In an exemplary embodiment, the converged sideslip angle value is an average of sideslip angle values previously determined by the preprocessor 114.

In FIG. 1, the air data estimation controller 102 includes an air data processor 116 configured to estimate air data parameters based on the converged value for the angle of attack $\alpha_c$ and the converged sideslip angle value $\beta_c$. The air data processor 116 is connected to the preprocessor 114, and data can be transmitted between the air data processor 116 and the preprocessor 114. The data can include, for example, one or more angle of attack values and one or more values for sideslip angle. In an exemplary embodiment, the air data parameters can be one or more of: Mach number, dynamic pressure, angle of attack, angle of sideslip, surface winds, airspeed, altitude, etc.

In an exemplary embodiment, the air data estimation controller 102 can also include the database 118 that is connected to the air data processor 116. The database 118 can store, for example, one or more freestream Mach number $M_\infty$ values, one or more angle of attack values, one or more values for sideslip angle, etc. FIG. 7 shows an exemplary table 700 that can be stored in the database 118. FIG. 7 will be discussed in greater detail later.

The vehicle guidance system of FIG. 1 also includes a flight control processor 110 configured to provide an output for adjusting an orientation of a vehicle 100 based on the estimated air data parameters. In an exemplary embodiment, the output is a control signal that is in the appropriate format to control a vehicle control system 120 which can be any device that can adjust the orientation of a vehicle 100. FIG. 1 shows the vehicle control system 120 connected to the flight control processor 110. The vehicle control system 120 can be, for example, an aileron, rudder, elevator, wing, thruster, turbine, engine, propeller, etc. That is, the vehicle control system 120 is the actual physical device or physical devices that cause the orientation of the vehicle 100 to be changed. The flight control processor 110 can be connected to an air data bus 108 that is connected to the air data processor 116 and one or more displays 112. All air data values that are determined by the preprocessor 114 and the air data processor 116, including the flight angles (i.e., converged angle of attack $\alpha_c$ and converged side slip angle $\beta_c$), are sent to the air data bus 108 so they can be distributed to the one or more displays 112 and the flight control processor 110. The flight control processor 110 sends guidance, navigation, and control commands to the vehicle control system 120. The displays 112 can be operator displays, for example, vehicle instrument gauges, LCD screens, LED screens, touchscreens, or any other display that is capable of conveying air data information to a pilot or operator of a vehicle 100.

In an exemplary embodiment, the preprocessor 114 is configured to set the initial value for angle of attack to a value obtained from a previously converged angle of attack solution produced by the preprocessor 114 (for example, $\alpha_1$ from a previous iteration; see step 300 of FIG. 3) or an input to the preprocessor 114 that represents a predicted trajectory of a vehicle 100.

In an exemplary embodiment, the vehicle guidance system can be in combination with a vehicle 100 as shown in FIG. 1. The vehicle 100 includes a vehicle body 106 upon which the surface-mounted pressure sensors 122 are mounted. The static ports 126 can also be mounted to the vehicle body 106.

In an exemplary embodiment, the vehicle includes the vehicle control system 120 that is configured to receive an output of the flight control processor 110 of the vehicle guidance system for altering orientation of the vehicle 100.

FIGS. 4A-4C show the steps performed by the preprocessor 114 in order to determine one or more angle of attack values and one or more sideslip angles in greater detail than FIG. 3. In FIGS. 4A-4C, the calibrated or converged angle of attack $\alpha_c$ and the calibrated or converged side slip angle $\beta_c$ are computed. See steps 440 and 474. FIG. 4D shows steps performed by the air data processor 116 to estimate air data parameters based on the converged angle of attack $\alpha_c$ and converged side slip angle $\beta_c$ values determined by the preprocessor 114.

The present disclosure includes a method for guiding a vehicle 100 that includes at least four surface-mounted pressure sensors 122 mounted on the vehicle 100 and the air data estimation controller 102 connected to each of the plurality of surface-mounted pressure sensors 122. The air data estimation controller 102 includes the preprocessor 114 and the air data processor 116. The method can include detecting, by each surface-mounted pressure sensor 122, a surface pressure distribution for a location of each such sensor 122 on the vehicle 100. The method can include setting, by the preprocessor 114, an initial value for angle of attack $\alpha_1$ of the vehicle 100 and an initial value for sideslip angle $\beta$ of the vehicle 100. See step 404 of FIG. 4A. In an exemplary embodiment, the initial value for angle of attack is set to zero. In an exemplary embodiment, the initial value for sideslip angle is set to zero. In an exemplary embodiment, the initial value of angle of attack is set to 20°±5° and the initial value for sideslip angle $\beta$ is set to zero. In an exemplary embodiment, the initial value for angle of attack is set to zero and the initial value for sideslip angle $\beta$ is set to 30°±5°.

Step 404 of FIG. 4A corresponds to steps 300 and 302 in FIG. 3. Additionally, in step 404 of FIG. 4A, an iterate value for the angle of attack $\alpha''$ is set. This initial iterate value will differ from the set value (e.g., initial guess) for the angle of attack as the solution proceeds.

The method for guiding the vehicle 100 can include receiving, in the preprocessor 114, surface pressure distribution values (e.g., $p_i$, $p_j$, $p_k$) of one or more first sets of three surface-mounted pressure sensors 122, each first set of three surface-mounted pressure sensors are located among three different geometric planes that are parallel to the ground. See step 400 of FIG. 4A. In an exemplary embodiment, the first set of three surface mounted sensors 122 are located among two different geometric planes that are parallel to the ground. In step 400 of FIG. 4A, three surface pressure distribution values $p_i$, $p_j$, $p_k$ are selected from the pressure measurement bus 104 (i.e., from among pressure measurements $p_1$, $p_2$, . . . , $p_N$), with the three surface-mounted pressure sensors 122 associated with the three surface pressure distribution values each being located in different x-y planes. Next, the three pressure measurements are differenced as indicated in step 402.

The method for guiding the vehicle 100 can include determining, by the preprocessor 114, a converged value for the angle of attack (e.g., $\alpha_c = \overline{\alpha}$) using the initial value for angle of attack $\alpha_1$, the initial value for sideslip angle $\beta$, and the surface pressure distribution values of the one or more first sets of three surface-mounted pressure sensors 122. In step 406 of FIG. 4A, with the sideslip angle $\beta$ and the positions of the surface-mounted pressure sensors, a first set of parameters $a_{i,j,k}$, $b_{i,j,k}$, and $c_{i,j,k}$ are computed. In step 408, from the first set of parameters $a_{i,j,k}$, $b_{i,j,k}$, and $c_{i,j,k}$, a second set of parameters $A_{i,j,k}$, $B_{i,j,k}$, $C_{i,j,k}$, $D_{i,j,k}$, and $E_{i,j,k}$ are computed. In step 410, the second set of parameters $A_{i,j,k}$, $B_{i,j,k}$, $C_{i,j,k}$, $D_{i,j,k}$, and $E_{i,j,k}$ are used with the pressure differences $P_{ik}$, $P_{ji}$, and $P_{kj}$ to obtain the coefficients of a fourth order trigonometric polynomial. After step 410, iterations for the angle of attack are performed. Step 412 is performed only if a new iteration for the angle of attack is required. In step 412, the iterate value for the angle of attack $\alpha_n$ is set as the initial value for the angle of attack $\alpha_1$. Step 400 can be re-entered if a new set of pressure differences are required without a change in sideslip angle (see the circled number 2 in FIG. 4A), or if the sideslip angle has been updated and a whole new set of iterations are begun for the angle of attack (see the circled number 4 in FIG. 4A).

FIG. 4B illustrates steps that are performed by the preprocessor 114 to determine one or more angle of attack values. In step 414, the functions $f$ and the derivative of $f$ are computed in order to begin the Newton-Raphson iterations in step 416. In step 418, if it is determined that the iterates $\alpha^{n+1}$ and $\alpha^n$ have not converged, a check is made in step 424 to ensure that the new iterate $\alpha^{n+1}$ is a number. If $\alpha^{n+1}$ is a number, in step 426 it is checked to ensure that $\alpha^{n+1}$ lies in a logical quadrant. In step 428, the new iterate $\alpha^{n+1}$ is used to update function $f$ and the derivative of function $f$ until convergence of the angle of attack value. In step 424, if the new iterate $\alpha^{n+1}$ is not a number, the process moves to another set of three pressure values that also satisfy the condition that the three surface-mounted pressure sensors 122 are located among at least two geometric planes that are parallel to the ground (step 430). In step 418, if the iterates $\alpha^{n+1}$ and $\alpha^n$ have converged, the converged value is saved in steps 420 and 422, and the next set of three pressure values that also satisfy the condition that the three surface-mounted pressure sensors 122 are located among at least two geometric planes that are parallel to the ground are used (step 430). In step 432, the last converged value is used on subsequent iterations to speed convergence. When computations with the last set of three pressure values that satisfy the condition that the three surface-mounted pressure sensors 122 are located among at least two geometric planes that are parallel to the ground are complete, all valid values of the angles of attack are averaged to produce the new angle of attack (step 434). In step 436, if the averaged angle of attack $\overline{\alpha}$ matches the last guess, all iterations are complete (step 440), and both the converged angle of attack ($\alpha_c = \overline{\alpha}$) and converged sideslip angle $\beta_c$ are outputted from the preprocessor 114 to the air data processor 116 (see the circled number five or six in FIG. 4B). The method then proceeds to either step 476 in FIG. 4D for the first approach using pressure data or to step 490 in FIG. 4E for the second approach using pressure data and aiding. The angle of attack value in step 440 is the converged value of the angle of attack ($\alpha_c = \overline{\alpha}$). In step 436, if the equality is not true, a new sideslip angle ($\alpha_1 = \overline{\alpha}$) is required to start the iterations over again. In step 438, the initial value (e.g., a guess) for the angle of attack $\alpha_1$ is updated to the value of the averaged angle of attack $\overline{\alpha}$, and a new value for the sideslip angle is computed (3). This entire process of FIG. 4B corresponds to steps 304, 306, 308, and 310 in FIG. 3.

In an exemplary embodiment, the preprocessor 114 is configured to determine that the converged value for the angle of attack is a value to be outputted by the preprocessor 114 when a difference of the converged value for the angle of attack ($\alpha_c = \overline{\alpha}$) and the initial value for the angle of attack $\alpha_1$ is less than a predetermined tolerance value $\in$ (see step 436).

In an exemplary embodiment, the preprocessor 114 is configured to determine a plurality of iterate values for the angle of attack (e.g., $\alpha^n$, $\alpha^{n+1}$, etc.), and updates the initial value for sideslip angle using $\alpha_1$ each time an iterate value for the angle of attack is determined until the converged value for the angle of attack ($\alpha_1 = \overline{\alpha}$) is obtained (see, e.g., step 412).

FIG. 4C illustrates steps that are performed to determine a sideslip angle value $\beta$. In an exemplary embodiment, iteration is not used to determine the sideslip angle value $\beta$. In an exemplary embodiment, iteration is used to determine the sideslip angle value $\beta$. The method for guiding the vehicle 100 can include receiving, in the preprocessor 114, surface pressure distribution values of one or more second sets of three surface-mounted pressure sensors 122, each second set of three surface-mounted pressure sensors 122 are located among three different geometric planes that are perpendicular to the ground. That is, the three surface-mounted pressure sensors in the second set are selected so that they are located in three different x-z planes (see step 442). In an exemplary embodiment, the second set of three surface-mounted pressure sensors 122 are located among two different geometric planes that are perpendicular to the ground. The first and second sets of pressure sensors 122 differ by at least one pressure sensor 122.

The method for guiding the vehicle 100 can include determining, by the preprocessor 114, a converged sideslip angle value $\beta_c$ based on the converged value for the angle of attack ($\overline{\alpha}$ which is set to $\alpha_1$ in step 438) and the surface pressure distribution values of the one or more second sets of three surface-mounted pressure sensors 122. In step 444, the surface pressure distribution values of the one or more second sets of three surface-mounted pressure sensors are differenced as in step 402 of FIG. 4A.

In step 446, parameters $A_{i,j,k}$ and $B_{i,j,k}$ are determined based on the current value for the angle of attack obtained from the steps of FIG. 4A ($\alpha_1$ from step 438), and the pressure differences of step 444. In step 448, coefficients $\hat{c}_0$, $\hat{c}_1$, $\hat{c}_2$ for a quadratic trigonometric polynomial are obtained based on the pressure differences $P_{ik}$, $P_{ji}$, $P_{kj}$ and parameters $A_{i,j,k}$ and $B_{i,j,k}$. In the unlikely event that the two higher order coefficients $\hat{c}_1$, $\hat{c}_2$ are both zero (step 450), the sideslip angle value $\beta$ is set to zero in step 452. In the other unlikely event that the highest order coefficient $\hat{c}_2$ is zero (step 454), the polynomial becomes linear and the root is explicitly given in step 456. For the more common case, two roots are determined (step 458), and the root closest to zero (step 460) is selected as the desired value (step 462 or step 464). If at any point, the sideslip angle value is not a number (step 466), this value for the sideslip angle is discarded, and the next set of three surface-mounted pressure sensors is selected (step 470). If, the sideslip angle value is a number, the value of the sideslip angle is saved in a memory (step 468) and the next set of three surface-mounted pressure sensors that satisfy the condition that the three surface-mounted pressure sensors 122 are located among three different geometric planes that are perpendicular to the ground is selected (470). Once all the sets of three surface-mounted pressure sensors that satisfy the condition that the three surface-mounted pressure sensors 122 are located among three different geometric planes that are perpendicular to the ground have been exhausted, the sideslip angles that are determined are averaged to provide a new sideslip angle value (step 472). The iterations for the angle of attack begin anew with the new value of the sideslip angle $\overline{\beta}$, that is set as $\beta_c$ in step 474 (see the circled number 4 in FIG. 4C). Once the angle of attack has converged, the most recent sideslip angle value has converged as well. The steps in FIG. 4C correspond to step 312 in FIG. 3.

The method for guiding the vehicle 100 can include outputting the converged value for the angle of attack $\alpha_c$ and the converged sideslip angle value $\beta_c$ from the preprocessor 114 to the air data processor 116.

The method for guiding the vehicle 100 can include estimating, by the air data processor 116, air data parameters based on the converged value for the angle of attack $\alpha_c$ and the converged sideslip angle value $\beta_c$ determined by the preprocessor 114.

In an exemplary embodiment of the method, the initial value for angle of attack is set to a value obtained from a previously converged angle of attack solution produced by the preprocessor 114 or an input to the preprocessor 114 that represents a predicted trajectory of a vehicle 100.

In an exemplary embodiment of the method, the converged value for the angle of attack is an average of angle of attack values previously determined by the preprocessor 114.

In an exemplary embodiment of the method, the converged sideslip angle value is an average of sideslip angle values previously determined by the preprocessor 114.

In an exemplary embodiment of the method, the preprocessor 114 determines that the converged value for the angle of attack is a value to be outputted by the preprocessor 114 when a difference of the converged value for the angle of attack ($\alpha_1 = \overline{\alpha}$) and the initial value for the angle of attack $\alpha_1$ is less than a predetermined tolerance value E.

In an exemplary embodiment of the method, the preprocessor 114 determines a plurality of iterate values for the angle of attack (e.g., $\alpha^n$, $\alpha^{n+1}$, etc.), and updates the initial value for sideslip angle $\alpha_1$ each time an iterate value for the angle of attack is determined until the converged value for the angle of attack ($\alpha_1 = \overline{\alpha}$) is obtained.

FIG. 4D illustrates steps that are performed by the air data processor 116 to determine the air data parameters. As mentioned earlier, FIG. 4D illustrates a first approach in which FADS pressure data are used to estimate the freestream and dynamic pressure. This approach is well suited for Mach numbers less than about Mach 2.

In step 476, an initial value for the Mach number $M_\infty^n$ is determined based on a preplanned trajectory of the vehicle 100. In step 478, with the converged angle of attack $\alpha_c$ (from step 440 of FIG. 4B) and the converged sideslip angle $\beta_c$ computed in the preprocessor 114, an estimate of the coefficient of pressures at each of the surface-mounted pressure sensor locations $C_{p_i}$ is made based on the Mach number, angle of attack, and sideslip table 700 stored in the database 118 and a trilinear interpolation or polynomial approximation. That is, using the Mach number $M_\infty$, the converged angle of attack $\alpha_c$, and the converged sideslip angle $\beta_c$, a coefficient of pressure can be directly obtained from a table entry, or can be interpolated based on the table entries. In step 480, a new freestream pressure $p_\infty^{n+1}$ and freestream dynamic pressure are computed $\overline{q}_\infty^{n+1}$. In step 482, a new Mach number $M_\infty^{n+1}$ is calculated. In step 480, the computations are based on differences between two pressure ports. This differencing effectively removes noise from the pressure signals. In step 484, if the new Mach number $M_\infty^{n+1}$ does not equal the old Mach number $M_\infty^n$, the new Mach number $M_\infty^{n+1}$ is used to obtain new coefficients of pressures (step 478), and iteration continues until there is convergence of the Mach number (step 484). In step 488, once the Mach number converges, one or more flight parameters (e.g., $M_\infty = M_\infty^{n+1}$, $p_\infty = p_\infty^{n+1}$, and $\overline{q}_\infty = \overline{q}_\infty^{n+1}$) are outputted to the air data bus 108.

Figure 5:
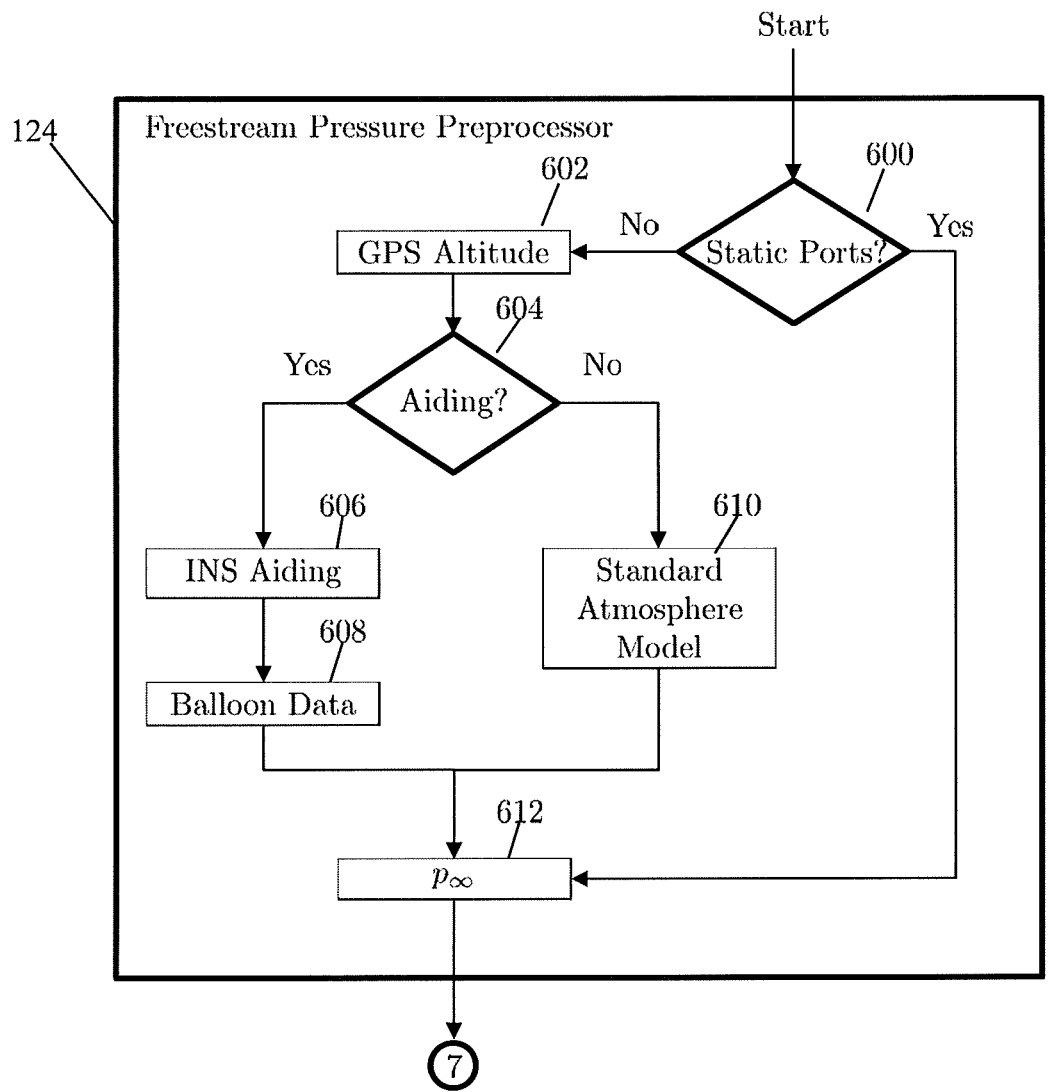
FIG. 5 is a block diagram illustrating a freestream pressure preprocessor according to an exemplary embodiment.

FIG. 4E illustrates steps that are performed by the air data processor 116 to determine the air data parameters using pressure data and aiding. In step 490, an initial value for the Mach number $M_\infty^n$ is determined based on a preplanned trajectory of the vehicle 100. In an exemplary embodiment, the preplanned trajectory is computed on the ground prior to flight of the vehicle 100, and the air data processor 116 receives an initial guess for the Mach number $M_\infty^n$ based on the preplanned trajectory in order to start the method of FIG. 4E. In step 492, with the converged angle of attack $\alpha_c$ (from step 440 of FIG. 4B) and the converged sideslip angle $\beta_c$ (from step 474 of FIG. 4C) computed in the preprocessor 114, an estimate of the coefficient of pressures at each of the surface-mounted pressure sensor locations $C_{p_i}$ is made based on the Mach number, angle of attack, and sideslip angle table 700 stored in the database 118 and a trilinear interpolation or polynomial approximation. That is, using the Mach number $M_\infty$, the converged angle of attack ac, and the converged sideslip angle $\beta_c$, a coefficient of pressure can be directly obtained from a table entry, or can be interpolated based on the table entries. In step 494, a new freestream dynamic pressure $\overline{q}_\infty^{n+1}$ is computed. In step 498, the freestream pressure $p_\infty$ is obtained from either a combination of inertial, weather balloon, and GPS data; just GPS data corrected with a local altimeter data; or from data from static pressure ports corrected with local altimeter data. FIG. 5 illustrates how the freestream pressure preprocessor 124 determines the freestream pressure $p_\infty$ value that is provided in step 498 of FIG. 4E. In step 500 of FIG. 4E, a new Mach number $M_\infty^{n+1}$ is calculated. In step 502, if the new Mach number $M_\infty^{n+1}$ does not equal the old Mach number $M_\infty^n$, the new Mach number $M_\infty^{n+1}$ is used to obtain new coefficients of pressures (step 492), and iteration continues until there is convergence of the Mach number (step 502). In step 506, once the Mach number converges, one or more flight parameters (e.g., $M_\infty = M_\infty^{n+1}$, $p_\infty = p_\infty^{n+1}$, and $\overline{q}_\infty = \overline{q}_\infty^{n+1}$) are outputted to the air data bus 108.

FIG. 5 illustrates the steps performed by the freestream pressure preprocessor 124 to determine the freestream pressure $p_\infty$ value (which is shown in step 498 of FIG. 4E). In step 600 of FIG. 5, if static pressure ports 126 are installed on the vehicle 100, the freestream pressure $p_\infty$ is measured directly by the static pressure ports 126. In an exemplary embodiment, the static pressure ports 126 are located away from the stagnation point of the vehicle 100 (i.e., away from the nose cone where maximum heating occurs). The method then proceeds to step 612 in which the freestream pressure $p_\infty$ measured by the static pressure ports 126 is outputted from the freestream pressure preprocessor 124 and sent to the air data processor 116 (see the circled number 7 in FIGS. 5 and 4E).

In step 600 of FIG. 5, if static pressure ports 126 are not installed on the vehicle 100, GPS altitude data for the vehicle 100 is received (step 602). In step 604, if aiding is used, the inertial velocity is obtained (e.g., from an inertial navigation system (INS)) (step 606) and temperatures and winds obtained from balloon data (step 608) are used to compute the freestream pressure $p_\infty$ (step 612). In an exemplary embodiment, the inertial velocity and balloon data can be sent wirelessly to the vehicle 100. Alternatively, the latest balloon data or atmosphere model can be loaded into the vehicle 100 prior to re-entry or prior to departure. Without aiding, in step 610, an atmosphere model (e.g., the 1976 Standard Atmosphere Model, the NASA Earth Global Reference Atmospheric Model, etc.) is used to convert the GPS altitude to an approximate freestream pressure $p_\infty$. The freestream pressure $p_\infty$ is sent to the air data processor 116 and used by the air data processor 116 to compute the freestream Mach number $M_\infty$ and the dynamic pressure $\overline{q}_\infty$.

Figure 6:
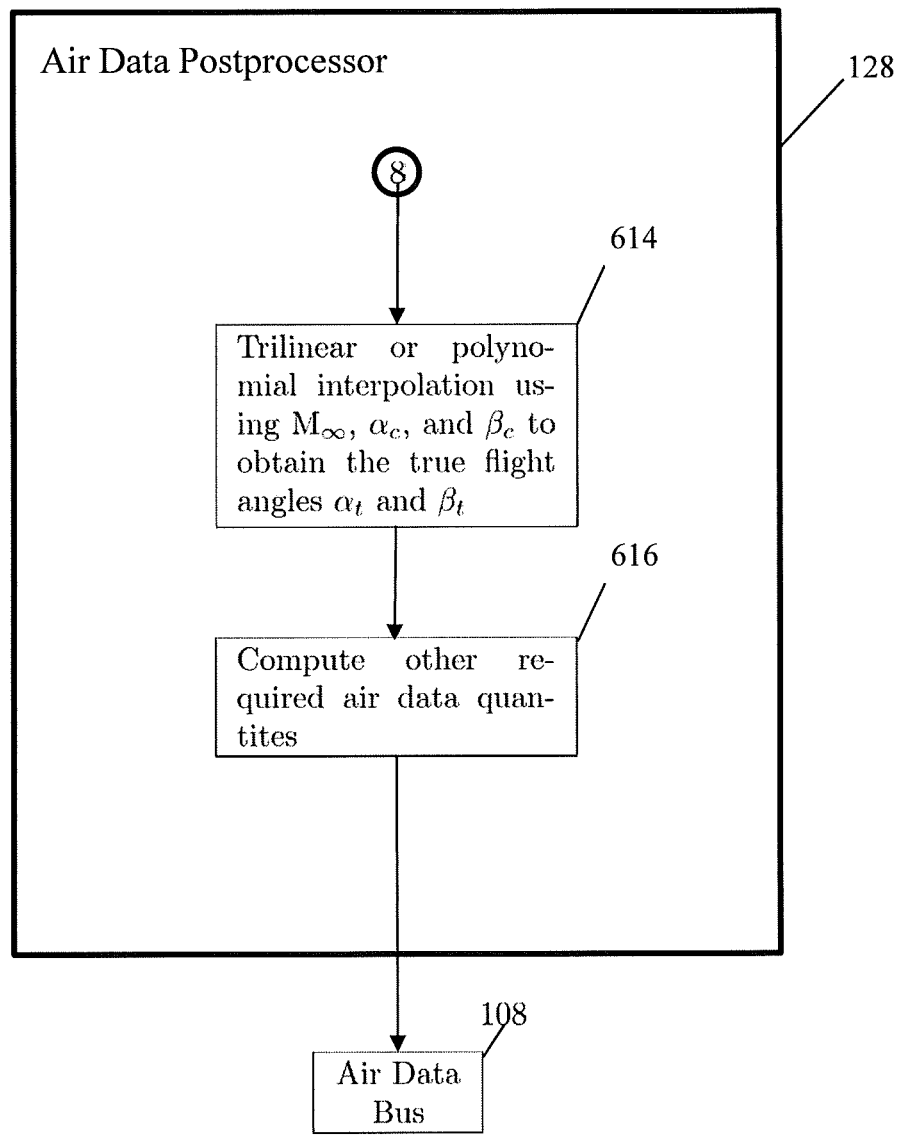
FIG. 6 is a block diagram illustrating an air data postprocessor according to an exemplary embodiment.

FIG. 6 illustrates steps that can be performed by the air data postprocessor 128. After step 506 in FIG. 4E, the method proceeds to step 614 of FIG. 6 (see the circled number 8 in FIGS. 4E and 6). With the Mach number $M_\infty$ now known, the calibrated flight angles (i.e., angle of attack $\alpha_c$ and sideslip angle $\beta_c$) can be converted to true flight angles (true angle of attack $\alpha_t$ and true sideslip angle value $\beta_t$) from trilinear or polynomial interpolation (step 614). That is, trilinear or polynomial interpolation using $M_\infty$, $\alpha_c$, and $\beta_c$ is performed to determine the true angle of attack $\alpha_t$ and the true sideslip angle value $\beta_t$. For example, a table with entries associating these data values to each other can be used for the interpolation. In step 616, the air data postprocessor 128 computes any other required air data quantity, such as calibrated or true airspeed, altitude, vertical velocity, etc. The air data postprocessor 128 outputs the true angle of attack $\alpha_t$, the true sideslip angle value $\beta_t$, and the other air data that it has computed to the air data bus 106.

In an exemplary embodiment, the vehicle guidance system of FIG. 1 includes a plurality of the surface-mounted pressure sensors 122 configured to be mounted on a vehicle 100, each sensor 122 being configured to detect a surface pressure distribution for a respective location of the corresponding sensor 122 on the vehicle 100, respectively. In FIG. 1, the vehicle guidance system also includes an air data estimation controller 102 configured to be connected to each of the plurality of surface-mounted pressure sensors 122. The air data estimation controller 102 is configured to receive an initial value for a Mach number $M_\infty^n$ of the vehicle 100. The air data estimation controller 102 (e.g., the preprocessor 114) is configured to calculate a converged value for an angle of attack $\alpha_c$ of the vehicle 100 based on first surface pressure data from a first set of the surface-mounted pressure sensors 122, and a converged sideslip angle value $\beta_c$ of the vehicle 100 based on second surface pressure data from a second set of the surface-mounted pressure sensors 122. The air data estimation controller 102 (e.g., the air data processor 116) is configured to calculate a freestream dynamic pressure $\bar{q}_\infty^{n+1}$ based at least on the initial value for Mach number $M_\infty^n$, the calculated converged value for angle of attack $\alpha_c$, and the calculated converged sideslip angle value $\beta_c$. The air data estimation controller 102 is also configured to calculate a freestream pressure $p_\infty$, and to calculate a converged value for Mach number $M_\infty$ based on the calculated freestream pressure $p_\infty$ and the calculated freestream dynamic pressure $\bar{q}_\infty^{n+1}$. In FIG. 1, the vehicle guidance system also includes a flight control processor 110 configured to receive the calculated converged value for Mach number $M_\infty$ and the calculated freestream pressure $p_\infty$ from the air data estimation controller 102, and to provide an output command for adjusting an orientation of the vehicle 100 based on the converged value for Mach number $M_\infty$ and the freestream pressure $p_\infty$. As mentioned above, the converged value for an angle of attack $\alpha_c$ is a calibrated (i.e., estimated) value that is later converted to the true angle of attack $\alpha_t$. Similarly, the converged sideslip angle value $\beta_c$ is a calibrated (i.e., estimated) value that is later converted to the true sideslip angle value $\beta_t$.

In an exemplary embodiment, the number of the plurality of surface-mounted pressure sensors is at least four sensors. In an exemplary embodiment, the number of the plurality of surface-mounted pressure sensors is at least seven sensors.

In an exemplary embodiment, the air data estimation controller 102 is configured to set an initial value for angle of attack $\alpha_1$ and set an initial value for sideslip angle $\beta$, and determine the converged value for the angle of attack $\alpha_c$ using the initial value for angle of attack $\alpha_1$, the initial value for sideslip angle $\beta$, and the first surface data which is surface pressure distribution values of one or more third sets of three of the surface-mounted pressure sensors 122. Each third set of three-surface mounted pressure sensors 122 are located among three different geometric planes that are parallel to the ground. The air data estimation controller 102 is configured to determine the converged sideslip angle value $\beta_c$ based on the converged value for the angle of attack $\alpha_c$ and the second surface pressure data which is surface pressure distribution values of one or more fourth sets of three of the surface-mounted pressure sensors 122, each fourth set of three-surface mounted pressure sensors 122 are located among three different geometric planes that are perpendicular to the ground. The third and fourth sets of pressure sensors 122 differ by at least one pressure sensor 122.

In an exemplary embodiment, the air data estimation controller 102 is configured to calculate the initial value for Mach number $M_\infty^n$ based on a predetermined trajectory of the vehicle 100.

In an exemplary embodiment, the air data estimation controller 102 is configured to calculate the freestream dynamic pressure $\bar{q}_\infty^{n+1}$ using coefficients of pressure obtained from a table 700 associating Mach number values, sideslip angle values, and angle of attack values. See step 492 of FIG. 4E.

In an exemplary embodiment, the air data estimation controller 102 is configured to calculate the freestream dynamic pressure $\bar{q}_\infty^{n+1}$ also using pressure data $p_i$, $p_j$ from two of the surface-mounted pressure sensors 122. See step 494 of FIG. 4E.

In an exemplary embodiment, the air data estimation controller 102 is configured to calculate the freestream pressure $p_\infty$ based on: a) altitude data from a global positioning system (GPS) device; b) altitude data from a global positioning system device, inertial velocity data 606 of the vehicle 100, and temperature and wind data obtained from a balloon (e.g., a weather balloon); or c) an atmosphere model and altitude data from a global positioning system device. In an exemplary embodiment, the air data estimation controller 102 is configured to calculate the freestream pressure $p_\infty$ based on one or more of: altitude data from a global positioning system device, inertial velocity data 606 of the vehicle 100, and temperature and/or wind data obtained from a balloon.

In an exemplary embodiment, the air data estimation controller 102 is configured to calculate the freestream pressure p, from data from one or more of the static pressure ports 126 mounted on the vehicle 100.

In an exemplary embodiment, the air data estimation controller 102 includes a preprocessor 114 that determines the converged value for the angle of attack $\alpha_c$ and the converged sideslip angle value $\beta_c$, and an air data processor 116 that calculates the converged value for Mach number $M_\infty$ and the freestream dynamic pressure $\bar{q}_\infty^{n+1}$.

In an exemplary embodiment, the flight control processor 110 is configured to receive a converged freestream dynamic pressure $\bar{q}_\infty$ in addition to the converged value for Mach number $M_\infty$ and the freestream pressure $p_\infty$ from the air data estimation controller 102, and to provide an output command for adjusting an orientation of a vehicle 100 based on the converged freestream dynamic pressure $\bar{q}_\infty$, the converged value for Mach number $M_\infty$, and the freestream pressure $p_\infty$.

In an exemplary embodiment shown in FIG. 6, the air data postprocessor 128 is configured to compute a true angle of attack $\alpha_t$ of the vehicle 100 and a true sideslip angle value $\beta_t$ of the vehicle 100 based on the converged value for Mach number $M_\infty$, the calculated converged value for angle of attack $\alpha_c$, and the calculated converged sideslip angle value $\beta_c$. See step 614 of FIG. 6. The flight control processor 110 is configured to provide an output command for adjusting an orientation of a vehicle 100 based on the converged value for Mach number $M_\infty$, the true angle of attack $\alpha_t$ of the vehicle 100, and the true sideslip angle value $\beta_t$ of the vehicle 100. As seen in FIG. 1, the output of the air data processor 128 is received by the air data bus 108.

In an exemplary embodiment shown in FIG. 6, the air data postprocessor 128 is configured to compute one or more air data quantities (e.g., true airspeed, altitude, etc.) based on the converged value for Mach number $M_\infty$ and the freestream pressure $p_\infty$ outputted by the air data processor 116. In an exemplary embodiment, the flight control processor 110 is configured to compute the one or more air data quantities based on the converged value for Mach number $M_\infty$ and the freestream pressure $p_\infty$.

In an exemplary embodiment shown in FIG. 1, a vehicle 100 includes the vehicle guidance system of the present disclosure, and a vehicle body 106 (e.g., nose cone, fuselage, etc.) upon which the surface-mounted pressure sensors 122 are mounted. The vehicle 100 also includes a vehicle control system 120 configured to receive an output of the flight control processor 110 of the vehicle guidance system for altering orientation of the vehicle 100.

Figure 8:
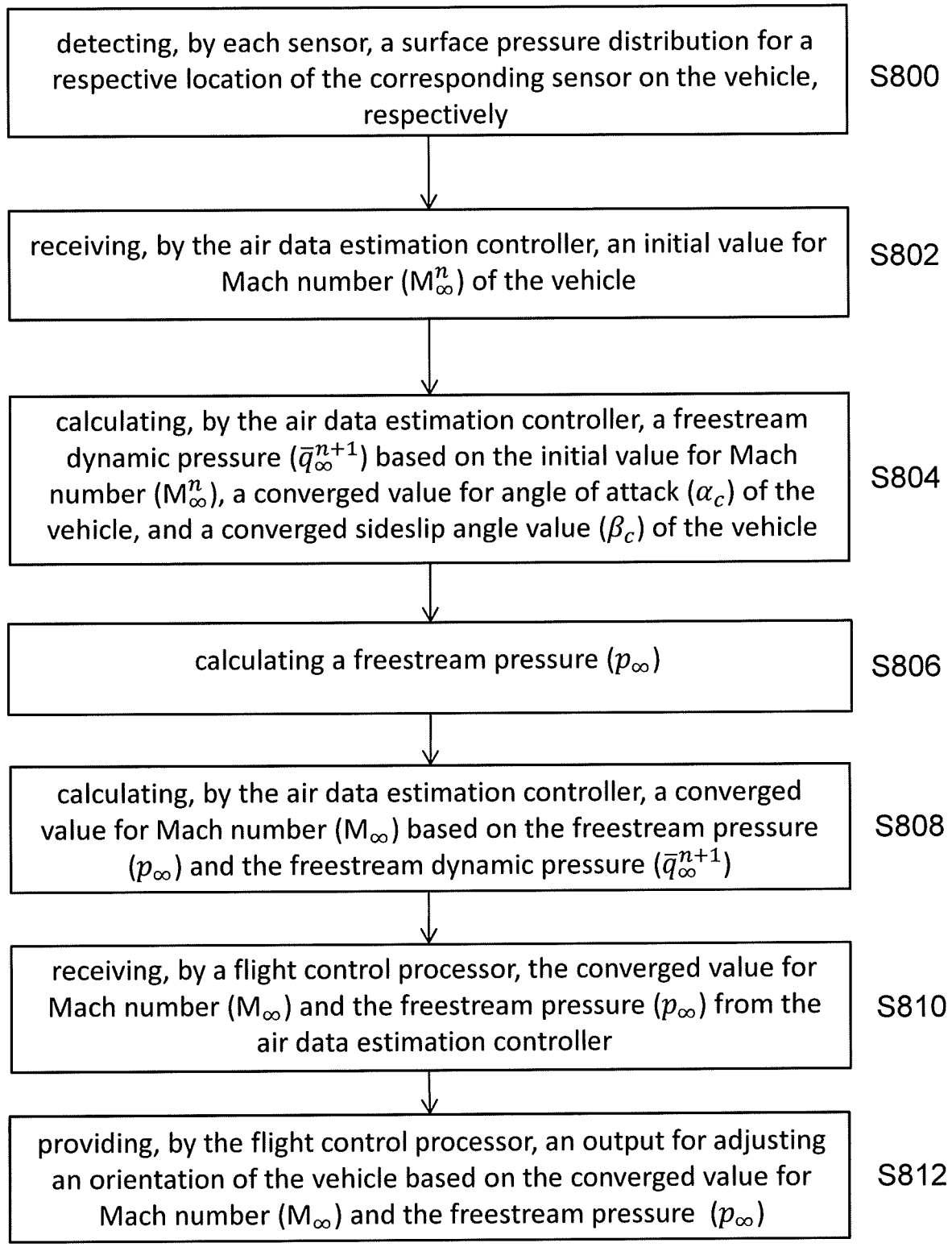
FIG. 8 is a flow chart illustrating a method according to an exemplary embodiment.

FIG. 8 illustrates an exemplary method for guiding a vehicle 100 that includes a plurality of surface-mounted pressure sensors 122 mounted on the vehicle 100 and an air data estimation controller 102 connected to each of the plurality of surface-mounted pressure sensors. The method includes detecting, by each surface-mounted pressure sensor 122, a surface pressure distribution for a respective location of the corresponding sensor 122 on the vehicle 100, respectively (step S800). Step S802 includes receiving, by the air data estimation controller 102, an initial value for Mach number $M_\infty^n$ of the vehicle 100. Step S804 includes calculating, by the air data estimation controller 102, a freestream dynamic pressure $\bar{q}_\infty^{n+1}$ based on the initial value for Mach number $M_\infty^n$, a converged value for angle of attack $\alpha_c$ of the vehicle 100, and a converged sideslip angle value $\beta_c$ of the vehicle 100. Step S806 includes calculating a freestream pressure $p_\infty$. Step S808 includes calculating, by the air data estimation controller 102, a converged value for Mach number $M_\infty$ based on the freestream pressure $p_\infty$ and the freestream dynamic pressure $\bar{q}_\infty^{n+1}$. Step S810 includes receiving, by a flight control processor 110, the converged value for Mach number $M_\infty$ and the freestream pressure $p_\infty$ from the air data estimation controller 102. Step S812 includes providing, by the flight control processor 110, an output command for adjusting an orientation of the vehicle 100 based on the converged value for Mach number $M_\infty$ and the freestream pressure $p_\infty$.

In an exemplary embodiment, the method includes setting, by the air data estimation controller 102, an initial value for angle of attack $\alpha_1$ and setting an initial value for sideslip angle $\beta$ (see steps 300 and 302 of FIG. 3 and step 404 of FIG. 4A). The method includes determining, by the air data estimation controller 102, the converged value for the angle of attack $\alpha_c$ (see step 440 of FIG. 4B) using the initial value for angle of attack $\alpha_1$, the initial value for sideslip angle $\beta$, and surface pressure distribution values of one or more first sets of three of the surface-mounted pressure sensors 122 (see step 400 of FIG. 4A). Each first set of three-surface mounted pressure sensors 122 are located among three different geometric planes that are parallel to the ground (see step 400 of FIG. 4A). The method includes determining, by the air data estimation controller 102, the converged sideslip angle value $\beta_c$ (see step 474 of FIG. 4C) based on the converged value for the angle of attack $\alpha_c$ and surface pressure distribution values of one or more second sets of three of the surface-mounted pressure sensors 122 (see step 442 of FIG. 4C). Each second set of three-surface mounted pressure sensors 122 are located among three different geometric planes that are perpendicular to the ground (see step 442 of FIG. 4C). In an exemplary embodiment, the first and second sets of pressure sensors 122 differ by at least one pressure sensor 122.

In an exemplary embodiment, the method includes calculating, by the air data estimation controller 102, the initial value for Mach number $M_\infty^n$ based on a predetermined trajectory of the vehicle 100 (see step 490 of FIG. 4E).

In an exemplary embodiment, the method includes calculating, by the air data estimation controller 102, the freestream dynamic pressure $\bar{q}_\infty^{n+1}$ using coefficients of pressure obtained from a table (for example, the table 700 in FIG. 7) associating Mach number values, sideslip angle values, and angle of attack values (see step 492 of FIG. 4E). The table of FIG. 7 is used to obtain the coefficients of pressure (e.g., $C_{pi}$, $C_{pj}$) from the $M_\infty$-$\alpha$-$\beta$ table via trilinear interpolation or from a polynomial approximation. As seen in FIG. 7, each coefficient in each row is based on a corresponding Mach number, angle of attack value, and sideslip angle value.

In an exemplary embodiment, the method includes calculating, by the air data estimation controller 102, the freestream dynamic pressure $\bar{q}_\infty^{n+1}$ using the coefficients of pressure (e.g., $C_{pi}$, $C_{pj}$) and pressure data (e.g., $p_i$, $p_j$) from two of the surface-mounted pressure sensors 122 (see step 494 of FIG. 4E).

In an exemplary embodiment shown in FIG. 5, the method includes calculating, by the air data estimation controller 102, the freestream pressure $p_\infty$ (see step 612 of FIG. 5) based on: a) altitude data from a global positioning system device (step 602); b) altitude data from a global positioning system device (step 602), inertial velocity data of the vehicle 100 (step 606), and temperature and wind data obtained from a balloon (step 608); or c) an atmosphere model (step 610) and altitude data from a global positioning system device (step 602).

In an exemplary embodiment shown in FIG. 5, the method includes calculating, by the air data estimation controller 102, the freestream pressure p, from data from one or more static pressure ports 126 mounted on the vehicle 100 (steps 600 and 612).

In an exemplary embodiment, the method includes receiving, by the flight control processor 110, a converged freestream dynamic pressure $\bar{q}_\infty$ in addition to the converged value for Mach number $M_\infty$ and the freestream pressure $p_\infty$ from the air data estimation controller 102 (see step 506 of FIG. 4E and FIG. 6). The method also includes providing, by the flight control processor 110, an output command for adjusting an orientation of the vehicle 100 based on the converged freestream dynamic pressure $\bar{q}_\infty$, the converged value for Mach number $M_\infty$, and the freestream pressure $p_\infty$.

In an exemplary embodiment, the method includes computing, by the air data postprocessor 128, a true angle of attack $\alpha_t$ of the vehicle 100 and a true sideslip angle value $\beta_t$ the vehicle 100 based on the converged value for Mach number $M_\infty$, the calculated converged value for angle of attack $\alpha_c$, and the calculated converged sideslip angle value $\beta_c$ (See step 614 of FIG. 6). The method also includes providing, by the flight control processor 110, an output command for adjusting an orientation of a vehicle 100 based on the converged value for Mach number $M_\infty$, the true angle of attack $\alpha_t$ of the vehicle 100, and the true sideslip angle value $\beta_t$ of the vehicle 100.

In an exemplary embodiment, the method includes receiving, by the vehicle control system 120, an output command of the flight control processor 110 of the vehicle guidance system for altering orientation of the vehicle 100.

In an exemplary embodiment, the method includes receiving, by the vehicle control system 120, an output command of the flight control processor 110 of the vehicle guidance system for altering orientation of the vehicle 100.

In an exemplary embodiment, the at least one processor device of the air data estimation controller 102 includes a preprocessor 114 that determines the converged value for the angle of attack $\alpha_c$ and the converged sideslip angle value $\beta_c$, and an air data processor 116 that calculates the converged value for Mach number $M_\infty$ and the freestream dynamic pressure $\bar{q}_\infty^{n+1}$. In an exemplary embodiment, the functions of all of the processors of the air data estimation controller 102 (i.e., preprocessor 114, air data processor 116, freestream pressure preprocessor 124, and air data postprocessor 128) can be performed by one or more processor devices. For example, the preprocessor 114, air data processor 116, freestream pressure preprocessor 124, and air data postprocessor 128 could be one processor device.

An exemplary embodiment is directed to a non-transitory computer-readable storage medium having instructions stored thereon which, when executed by at least one processor of an air data estimation controller 102 (e.g., one or more of preprocessor 114, air data processor 116, freestream pressure preprocessor 124, air data postprocessor 128), perform a method for guiding a vehicle 100, wherein the vehicle 100 includes a plurality of surface-mounted pressure sensors mounted on the vehicle 100 and the air data estimation controller 102 is connected to each of the plurality of surface-mounted pressure sensors. The method includes receiving a detected surface pressure distribution for a respective location of the corresponding sensor 122 on the vehicle 100, respectively. The method also includes receiving an initial value for Mach number $M_\infty^n$ of the vehicle 100. The method also includes calculating a freestream dynamic pressure $\bar{q}_\infty^{n+1}$ based on the initial value for Mach number $M_\infty^n$, a converged value for angle of attack $\alpha_c$ of the vehicle 100, and a converged sideslip angle value $\beta_c$ of the vehicle 100. The method also includes calculating a freestream pressure $p_\infty$. Further, the method includes calculating a converged value for Mach number $M_\infty$ based on the freestream pressure $p_\infty$ and the freestream dynamic pressure $\bar{q}_\infty^{n+1}$. The method additionally includes sending, to a flight control processor 110, the converged value for Mach number $M_\infty$ and the freestream pressure $p_\infty$ from the air data estimation controller 102, so that the flight control processor 110 can provide an output command for adjusting an orientation of the vehicle 100 based on the converged value for Mach number $M_\infty$ and the freestream pressure $p_\infty$.

A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

The air data estimation controller 102 and the flight control processor 110 as discussed herein may be a single hardware processor, a plurality of hardware processors, or combinations thereof. Hardware processor devices may have one or more processor "cores." The term "database" as discussed herein is used to generally refer to tangible media such as a memory device.

Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The air data estimation controller 102 and the flight control processor 110 may be special purpose or general purpose hardware processor devices. The air data estimation controller 102 may be connected to a communication infrastructure, such as a bus, message queue, network, multi-core message-passing scheme, etc. The network may be any network suitable for performing the functions as disclosed herein and may include a wireless network (e.g., Wi-Fi), a mobile communication network, a satellite network, fiber optic, coaxial cable, infrared, radio frequency (RF), or any combination thereof. Other suitable network types and configurations will be apparent to persons having skill in the relevant art. The air data estimation controller 102 may also include a memory (e.g., random access memory, read-only memory, etc.). The memory may be read from and/or written to in a well-known manner. In an embodiment, the memory may be non-transitory computer readable recording media.

Data stored in the air data estimation controller 102 (e.g., in the database 118) may be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the database 118.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The air data estimation controller 102 may also include a communications interface. The communications interface may be configured to allow software and data to be transferred between the air data estimation controller 102 and external devices. Exemplary communications interfaces may include a modem, a network interface (e.g., an Ethernet card), a communications port, a PCMCIA slot and card, etc. Software and data transferred via the communications interface may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a cellular phone link, a radio frequency link, etc.

Computer programs (e.g., computer control logic) may be stored in one or more on-board memory devices. Computer programs may also be received via the communications interface. Such computer programs, when executed, may enable the air data estimation controller 102 to implement the present methods as discussed herein. In particular, the computer programs, when executed, may enable the air data estimation controller 102 to implement the methods illustrated by FIGS. 3, 4A-4E, 5, 6, and 8, or similar methods, as discussed herein. Where the present disclosure is implemented using software, the software may be stored in a computer program product or non-transitory computer readable medium and loaded into the air data estimation controller 102 using a removable storage drive or communications interface.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A vehicle guidance system, comprising:
    a plurality of surface-mounted pressure sensors configured to be mounted on a vehicle, each sensor being configured to detect a surface pressure distribution for a respective location of the corresponding sensor on the vehicle, respectively;
    an air data estimation controller configured to be connected to each of the plurality of surface-mounted pressure sensors, the air data estimation controller being configured to:
        receive an initial value for a Mach number of the vehicle,
        calculate a converged value for an angle of attack of the vehicle based on first surface pressure data from a first set of the surface-mounted pressure sensors, and a converged sideslip angle value of the vehicle based on second surface pressure data from a second set of the surface-mounted pressure sensors,
        calculate a freestream dynamic pressure based on the initial value for Mach number, the calculated converged value for angle of attack, and the calculated converged sideslip angle value,
        calculate a freestream pressure, and
        calculate a converged value for Mach number based on the calculated freestream pressure and the calculated freestream dynamic pressure; and
    a flight control processor configured to receive the calculated converged value for Mach number and the calculated freestream pressure from the air data estimation controller, and to provide an output command for adjusting an orientation of the vehicle based on the converged value for Mach number and the freestream pressure.

2. The vehicle guidance system of claim 1, wherein the air data estimation controller is configured to:
    set an initial value for angle of attack and set an initial value for sideslip angle, and determine the converged value for the angle of attack using the initial value for angle of attack, the initial value for sideslip angle, and the first surface pressure data which is surface pressure distribution values of one or more of three of the surface-mounted pressure sensors, wherein each of the three surface-mounted pressure sensors for the first surface pressure data are located among three different geometric planes that are parallel to the ground, and
    determine the converged sideslip angle value based on the converged value for the angle of attack and the second surface pressure data which is surface pressure distribution values of one or more of three of the surface-mounted pressure sensors, wherein each of the three surface-mounted pressure sensors for the second surface pressure data are located among three different geometric planes that are perpendicular to the ground, and wherein the three surface-mounted pressure sensors for the first surface pressure data differ from the three surface-mounted pressure sensors for the second surface pressure data by at least one pressure sensor.

3. The vehicle guidance system of claim 2, wherein the air data estimation controller includes a preprocessor that determines the converged value for the angle of attack and the converged sideslip angle value, and an air data processor that calculates the converged value for Mach number and the freestream dynamic pressure.

4. The vehicle guidance system of claim 1, wherein the air data estimation controller is configured to calculate the initial value for Mach number based on a predetermined trajectory of the vehicle.

5. The vehicle guidance system of claim 1, wherein the air data estimation controller is configured to calculate the freestream dynamic pressure using coefficients of pressure obtained from a table associating Mach number values, sideslip angle values, and angle of attack values.

6. The vehicle guidance system of claim 5, wherein the air data estimation controller is configured to calculate the freestream dynamic pressure also using pressure data from two of the surface-mounted pressure sensors.

7. The vehicle guidance system of claim 1, wherein the air data estimation controller is configured to calculate the freestream pressure based on:
    a) altitude data from a global positioning system device;
    b) altitude data from the global positioning system device, inertial velocity data of the vehicle, and temperature and wind data obtained from a balloon; or
    c) an atmosphere model and altitude data from the global positioning system device.

8. The vehicle guidance system of claim 1, wherein the air data estimation controller is configured to calculate the freestream pressure from data from one or more static pressure ports mounted on the vehicle.

9. The vehicle guidance system of claim 1, wherein the flight control processor is configured to receive a converged freestream dynamic pressure in addition to the converged value for Mach number and the freestream pressure from the air data estimation controller, and to provide the output command for adjusting the orientation of the vehicle based on the converged freestream dynamic pressure, the converged value for Mach number, and the freestream pressure.

10. The vehicle guidance system of claim 1,
    wherein an air data postprocessor is configured to compute a true angle of attack of the vehicle and a true sideslip angle value of the vehicle based on the converged value for Mach number, the calculated converged value for angle of attack, and the calculated converged sideslip angle value, and
    wherein the flight control processor is configured to provide the output command for adjusting the orientation of the vehicle based on the converged value for Mach number, the true angle of attack of the vehicle, and the true sideslip angle value of the vehicle.

11. The vehicle guidance system of claim 1, wherein an air data postprocessor is configured to compute one or more air data quantities based on the converged value for Mach number and the freestream pressure.

12. The vehicle guidance system of claim 1, wherein the plurality of surface-mounted pressure sensors is at least four sensors.

13. The vehicle guidance system of claim 1, wherein the plurality of surface-mounted pressure sensors is at least seven sensors.

14. A vehicle comprising:
the vehicle guidance system of claim 1;
a vehicle body upon which the plurality of surface-mounted pressure sensors are mounted; and
a vehicle control system configured to receive the output of the flight control processor of the vehicle guidance system for altering the orientation of the vehicle.

15. A method for guiding a vehicle that includes a plurality of surface-mounted pressure sensors mounted on the vehicle and an air data estimation controller connected to each of the plurality of surface-mounted pressure sensors, the method comprising:
detecting, by each surface-mounted pressure sensor, a surface pressure distribution for a respective location of the corresponding sensor on the vehicle, respectively;
receiving, by the air data estimation controller, an initial value for Mach number of the vehicle;
calculating, by the air data estimation controller, a freestream dynamic pressure based on the initial value for Mach number, a converged value for angle of attack of the vehicle, and a converged sideslip angle value of the vehicle;
calculating a freestream pressure;
calculating, by the air data estimation controller, a converged value for Mach number based on the freestream pressure and the freestream dynamic pressure;
receiving, by a flight control processor, the converged value for Mach number and the freestream pressure from the air data estimation controller; and
providing, by the flight control processor, an output command for adjusting an orientation of the vehicle based on the converged value for Mach number and the freestream pressure.

16. The method of claim 15, comprising:
setting, by the air data estimation controller, an initial value for angle of attack and setting an initial value for sideslip angle;
determining, by the air data estimation controller, the converged value for the angle of attack using the initial value for angle of attack, the initial value for sideslip angle, and surface pressure distribution values of one or more first sets of three of the surface-mounted pressure sensors, wherein each first set of three of the surface-mounted pressure sensors are located among three different geometric planes that are parallel to the ground; and
determining, by the air data estimation controller, the converged sideslip angle value based on the converged value for the angle of attack and surface pressure distribution values of one or more second sets of three of the surface-mounted pressure sensors, wherein each second set of three-surface mounted pressure sensors are located among three different geometric planes that are perpendicular to the ground, and the first and second sets of pressure sensors differ by at least one pressure sensor.

17. The method of claim 16, wherein the at least one processor device of the air data estimation controller includes a preprocessor that determines the converged value for the angle of attack and the converged sideslip angle value, and an air data processor that calculates the converged value for Mach number and the freestream dynamic pressure.

18. The method of claim 15, comprising:
calculating, by the air data estimation controller, the initial value for Mach number based on a predetermined trajectory of the vehicle.

19. The method of claim 15, comprising:
calculating, by the air data estimation controller, the freestream dynamic pressure using coefficients of pressure obtained from a table associating Mach number values, sideslip angle values, and angle of attack values.

20. The method of claim 19, comprising:
calculating, by the air data estimation controller, the freestream dynamic pressure using the coefficients of pressure and pressure data from two of the surface-mounted pressure sensors.

21. The method of claim 15, comprising:
calculating, by the air data estimation controller, the freestream pressure based on:
a) altitude data from a global positioning system device;
b) altitude data from a global positioning system device, inertial velocity data of the vehicle, and temperature and wind data obtained from a balloon; or
c) an atmosphere model and altitude data from a global positioning system device.

22. The method of claim 15, comprising:
calculating, by the air data estimation controller, the freestream pressure from data from one or more static pressure ports mounted on the vehicle.

23. The method of claim 15, comprising:
receiving, by the flight control processor, a converged freestream dynamic pressure in addition to the converged value for Mach number and the freestream pressure from the air data estimation controller; and
providing, by the flight control processor, the output command for adjusting the orientation of the vehicle based on the converged freestream dynamic pressure, the converged value for Mach number, and the freestream pressure.

24. The method of claim 15, comprising:
computing, by an air data postprocessor, a true angle of attack of the vehicle and a true sideslip angle value of the vehicle based on the converged value for Mach number, the calculated converged value for angle of attack, and the calculated converged sideslip angle value; and
providing, by the flight control processor, the output command for adjusting the orientation of the vehicle based on the converged value for Mach number, the true angle of attack of the vehicle, and the true sideslip angle value of the vehicle.

25. The method of claim 15, comprising:
receiving, by a vehicle control system, the output command of the flight control processor of the vehicle guidance system for altering the orientation of the vehicle.

26. A non-transitory computer-readable storage medium having instructions stored thereon which, when executed by at least one processor of an air data estimation controller, perform a method for guiding a vehicle, wherein the vehicle includes a plurality of surface-mounted pressure sensors mounted on the vehicle and the air data estimation controller is connected to each of the plurality of surface-mounted pressure sensors, the method comprising:
receiving a detected surface pressure distribution for a respective location of the corresponding sensor on the vehicle, respectively;
receiving an initial value for Mach number of the vehicle;
calculating a freestream dynamic pressure based on the initial value for Mach number, a converged value for angle of attack of the vehicle, and a converged sideslip angle value of the vehicle;

calculating a freestream pressure;
calculating a converged value for Mach number based on the freestream pressure and the freestream dynamic pressure; and
sending, to a flight control processor, the converged value for Mach number and the freestream pressure from the air data estimation controller, so that the flight control processor can provide an output command for adjusting an orientation of the vehicle based on the converged value for Mach number and the freestream pressure.

* * * * *